United States Patent [19]

Sternberg et al.

[11] Patent Number: 4,464,788
[45] Date of Patent: Aug. 7, 1984

[54] DYNAMIC DATA CORRECTION GENERATOR FOR AN IMAGE ANALYZER SYSTEM

[75] Inventors: Stanley R. Sternberg; Robert M. Lougheed; William O. Dargel, all of Ann Arbor, Mich.

[73] Assignee: Environmental Research Institute of Michigan, Ann Arbor, Mich.

[21] Appl. No.: 300,328

[22] Filed: Sep. 8, 1981

Related U.S. Application Data

[63] Continuation of Ser. No. 73,816, Sep. 10, 1979, Pat. No. 4,290,049.

[51] Int. Cl.$^3$ .................. G06K 9/00; G06F 15/20
[52] U.S. Cl. ........................... 382/41; 364/725; 382/49
[58] Field of Search .............. 382/16, 21, 23, 26, 382/34, 41, 47-52; 358/260-262, 280-284; 364/725, 200, 900; 340/728; 343/5 MM, 5 DP

[56] References Cited

U.S. PATENT DOCUMENTS

| | | | |
|---|---|---|---|
| 3,106,698 | 10/1963 | Unger | 382/49 |
| 3,106,699 | 10/1963 | Kamentsky | 382/49 |
| 3,196,398 | 7/1965 | Baskin | 382/49 |
| 3,214,574 | 10/1965 | Landsman et al. | 382/49 |
| 3,275,986 | 9/1966 | Dunn et al. | 382/14 |
| 3,287,703 | 11/1966 | Slotnick | 364/200 |
| 3,289,164 | 11/1966 | Rabinow | 382/47 |
| 3,339,179 | 10/1967 | Shelton, Jr. et al. | 382/49 |
| 3,424,900 | 1/1969 | Muller | 382/14 |
| 3,573,728 | 4/1971 | Sharp et al. | 340/728 |
| 3,624,604 | 11/1971 | Gibbard | 382/16 |
| 3,636,513 | 1/1972 | Tisdale | 382/26 |
| 3,638,188 | 1/1972 | Pincoffs et al. | 382/26 |
| 3,706,071 | 12/1972 | Gray | 382/49 |
| 3,723,970 | 3/1973 | Stoller | 382/50 |
| 3,748,644 | 7/1973 | Tisdale | 382/23 |
| 3,761,876 | 9/1973 | Flaherty et al. | 382/52 |
| 3,805,035 | 4/1974 | Serra | 382/49 |
| 3,846,754 | 11/1974 | Oka et al. | 382/49 |
| 3,878,530 | 4/1975 | Wilmont | 343/5 DP |
| 3,889,234 | 6/1975 | Makihara et al. | 382/26 |
| 3,899,771 | 8/1975 | Saraga et al. | 382/21 |
| 3,959,771 | 9/1976 | Uno et al. | 382/48 |
| 3,968,475 | 7/1976 | McMahon | 382/21 |
| 4,003,024 | 1/1977 | Riganati et al. | 382/49 |
| 4,047,152 | 9/1977 | Giuliano et al. | 382/50 |
| 4,060,713 | 11/1977 | Golay | 382/49 |
| 4,097,847 | 6/1978 | Forsen et al. | 382/52 |
| 4,110,736 | 8/1978 | Kono | 382/25 |
| 4,129,854 | 12/1978 | Suzuki et al. | 382/54 |
| 4,134,021 | 1/1979 | Klemt | 382/34 |
| 4,149,143 | 4/1979 | Nagano et al. | 382/53 |
| 4,162,482 | 7/1979 | Su | 382/49 |
| 4,167,728 | 9/1979 | Sternberg | 382/49 |
| 4,174,514 | 11/1979 | Sternberg | 382/49 |
| 4,330,833 | 5/1982 | Pratt et al. | 382/49 |

OTHER PUBLICATIONS

Page, "Technique for Bit-Array Manipulation," *IBM Tech. Disclosure Bulletin*, vol. 16, No. 6, Nov. 1973, pp. 2021-2025.
Golay, "Hexagonal Parallel Pattern Transformations," *IEEE Trans. on Computers*, vol. C-18, No. 8, pp. 733-740, Aug. 1969.
Klein, et al., "The Texture Analyzer," *J. of Microscopy*, vol. 95, PT. 2, Nov., 1971. pp. 349-356.
Matheron, "Random Set Theory and its Applications to Stereology," *J. of Microscopy*, vol. 95, PT. 1, pp. 15-23, Feb., 1972.
McCormick, "The Illinois Pattern Recognition Computer Illiac III," *IEEE Trans. on Electronic Computers*, vol. EC-12, Dec., 1963, pp. 791-813.
Preston, "Feature Extraction by Golay Hexagonal Pattern Transforms," *IEEE Trans. on Computers*, vol. C-20, No. 9. Sep. 1971.
Serra, "Stereology and Structuring Elements," *J. of Microscopy*, vol. 95, PT. 1, pp. 93-103, Feb. 1972.
Unger, "Pattern Detection and Recognition," *Proc. of the IRE*, vol. 47, pp. 1737-1752, 1959.
Brickman, "Optical Char. Rec. with Programmable Logic Arrays," *IBM Tech. Disclosure Bulletin*, vol. 18, No. 5, Oct. 1975, pp. 1520-1521.

*Primary Examiner*—Leo H. Boudreau
*Attorney, Agent, or Firm*—Krass & Young

[57] ABSTRACT

Dynamic data generator circuitry is disclosed for use in an image analyzer system. The system includes a plurality of storage devices for temporarily storing a neighborhood in the image matrix comprised of a central data point and its surrounding points in the matrix. A transformation generator includes neighborhood contribution circuitry for operating on the values of each point in the neighborhood when they are loaded in the storage devices. The maximum value associated with any of the adjusted points in the neighborhood is provided as a transformation output signal. To aid in the maximum value selection process, the value of the central data point in the neighborhood is sensed and used to provide a correction value so that all of the adjusted data points in the neighborhood are within a particular range of values so that the maximum value selection circuitry may accurately identify the data point in the neighborhood truly having the maximum value associated with the image.

7 Claims, 40 Drawing Figures

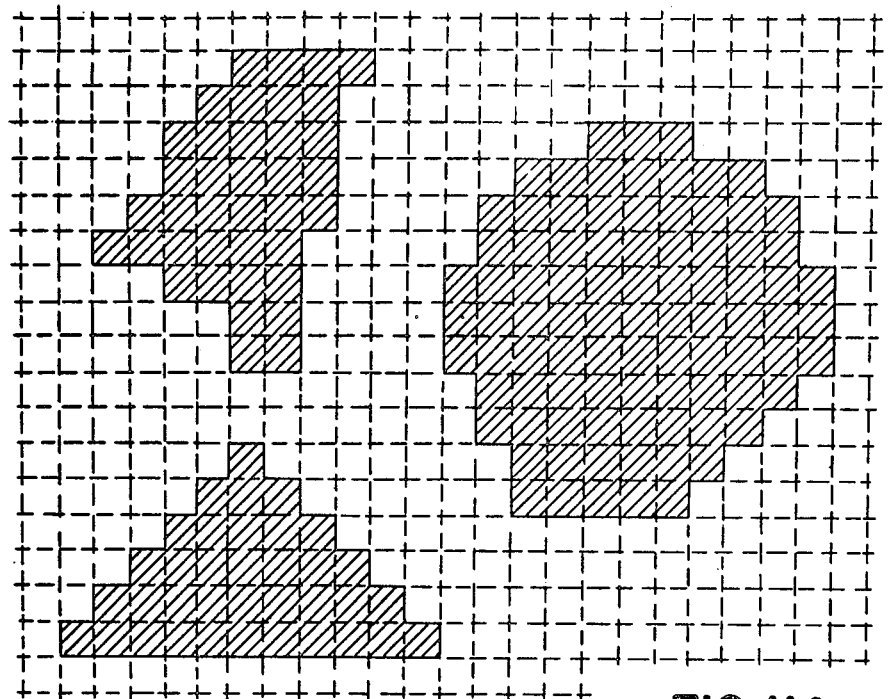
FIG. IIA
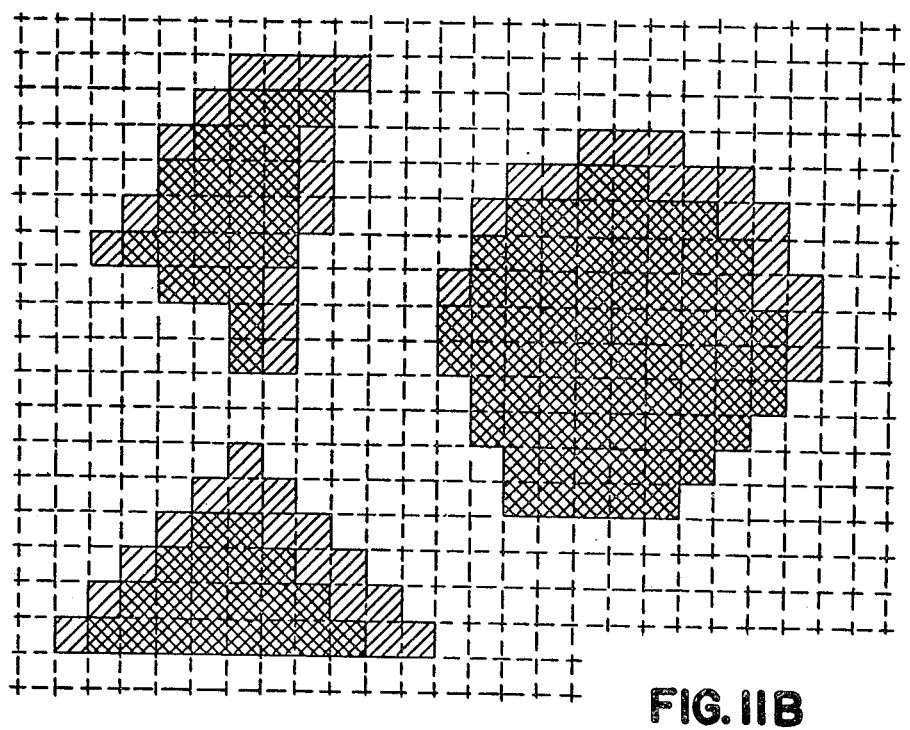
FIG. IIB

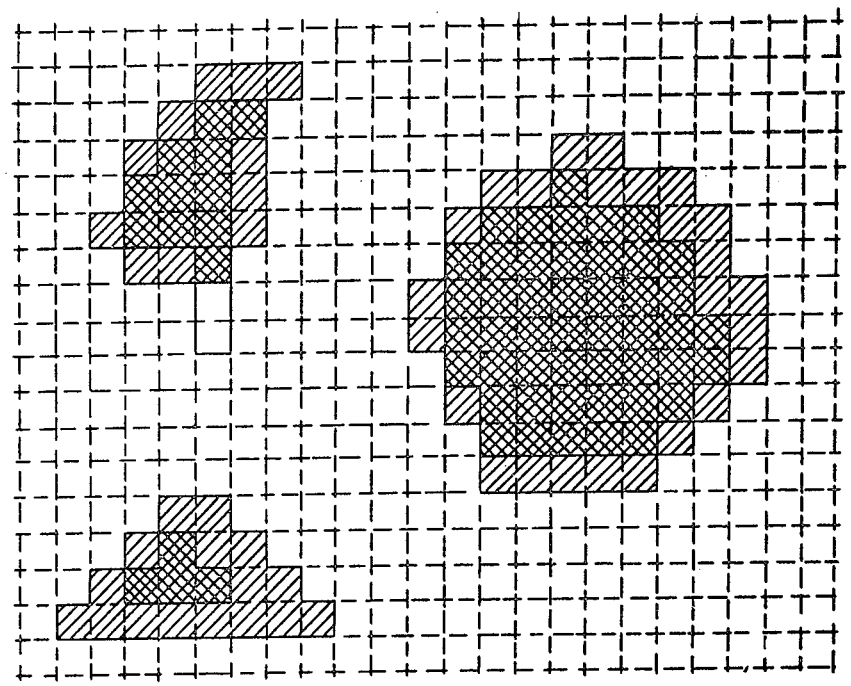
FIG. IIC
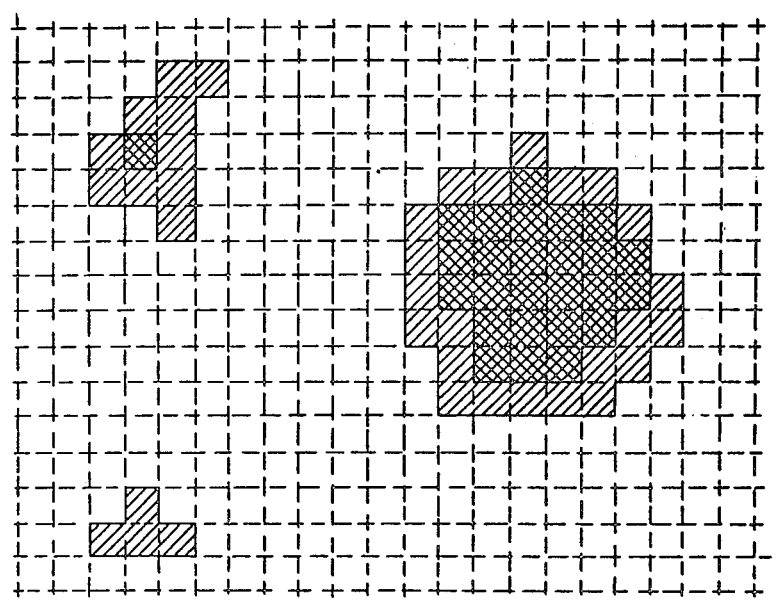
FIG. IID

INPUT DATA BEFORE CORRECTION

INPUT DATA AFTER CORRECTION

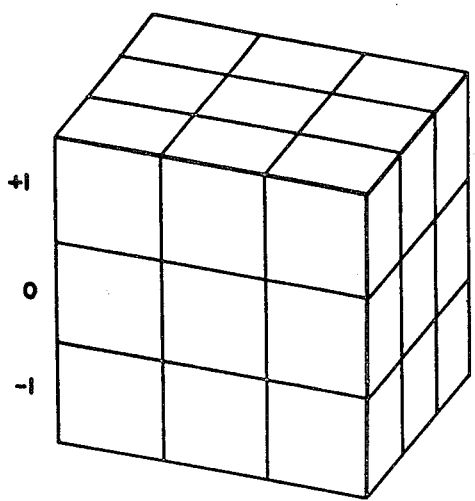
FIG.15A
3D WINDOW (RECTANGULAR)
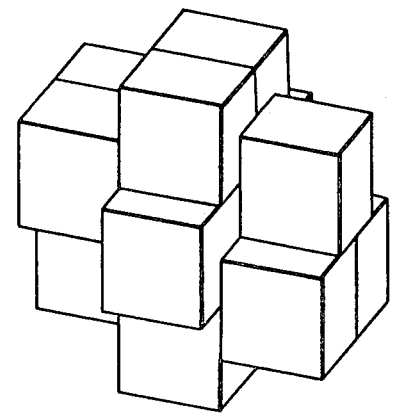
FIG.15B
3D WINDOW (HEXAGONAL)
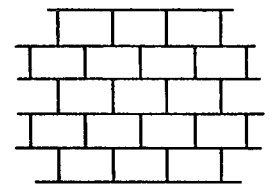
FIG.15C
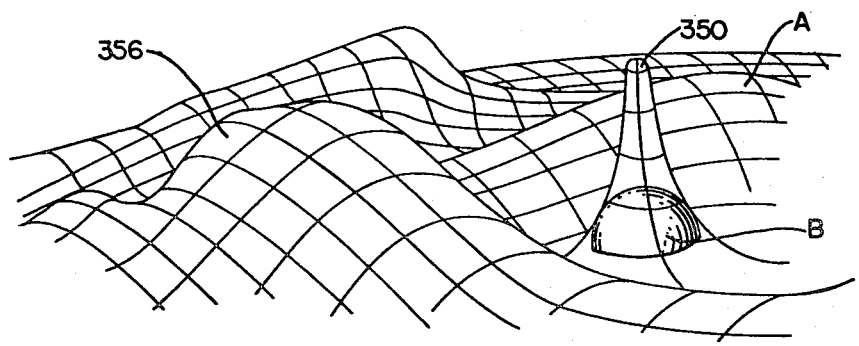
FIG.17
| X | 0 | +1 |
|---|---|---|
| +1 | 0 | +1 |
| -1 | X | 0 |
FIG.16A
| 0 | X | +1 |
|---|---|---|
| -1 | 0 | -1 |
| -1 | 0 | X |
FIG.16B
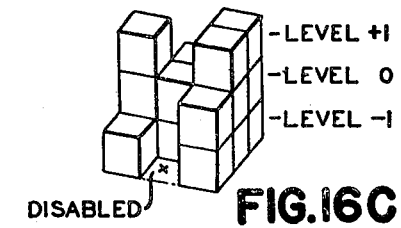
FIG.16C

DYNAMIC DATA CORRECTION GENERATOR FOR AN IMAGE ANALYZER SYSTEM

This application is a continuation application of U.S. Ser. No. 073,816, filed Sept. 10, 1979, now U.S. Pat. No. 4,290,049, entitled "Dynamic Data Correction Generator For An Image Analyzer System" which is assigned to the assignee of the present invention.

BACKGROUND OF THE INVENTION

This invention relates to pattern recognition and analysis devices and, more particularly, to a class of automatic image processors employing techniques of integral geometry to classify patterns in an input image, represented by a matrix of electrical signals.

A wide variety of applications exist in which it would be desirable for a machine to automatically recognize, analyze, and/or classify patterns existing in images which have been sensed and converted to some sort of matrix of electrical signals. Some of the simpler problems, which have been implemented with at least limited success by machines, include the recognition of alphanumeric characters and recognition or counting of certain particles, such as blood cells. (see, e.g. U.S. Pat. Nos. 3,846,754 to Oka; 3,196,398 to Baskin; 3,573,789 to Sharp; 3,761,876 to Flaherty; 3,287,703 to Slotnick, and 3,899,771 to Saraga et al) More ambitious tasks to this class, which appear to be beyond the ability of present technology, would be automatic recognition of military targets from infrared imaging sensors, or the translation of handwriting into a machine usable code.

Elaborate programs have been written for general purpose computers to perform pattern analysis and classification. The limited success of the general purpose computer to perform pattern analysis and classification is due to the extremely long processing times to process images with very many data points. A more promising approach may be the use of a special purpose processor which implements a mathematical technique applicable to data in the form of images, integral geometry being such a technique. One such approach considers the input data as an M by N array of zeroes and ones representing black or white picture elements. From the input array another M by N array is derived wherein each point in the second array is a function of the state of the equivalent point in the initial array. A series of these transforms may be performed to determine some of the characteristics of patterns displayed in the initial array. For example, U.S. Pat. No. 3,241,547 discloses such a special purpose image processor used for counting lymphocytes in blood. Devices employing similar forms of processors for implementing these "neighborhood transforms" are disclosed in Pattern Dectection and Recognition by Unger, Proceedings of the IRE, 1959, page 737, and Feature Extraction by Golay Hexagonal Pattern Transforms, Preston, Jr., IEEE Transactions on Computers, Volume C-20, No. 9, September, 1971.

These prior art image processors have been operated on images wherein the data points have been reduced to binary form, either zero or one, in accordance with the conventional requirements of integral geometry. For applications of integral geometry in pattern recognition see:

1. G. Matheron, Random Sets and Integral Geometry, Wiley, 1975.
2. Albert B. J. Novikoff, "Integral Geometry as a Tool in Pattern Reception", in Principles of Self-Organization, edited by Von Foerstn and Zopf, Pergamon Press, 1962.
3. J. Serra, "Stereology and Structuring Elements," Journal of Microscopy, Volume 95, Part 1, February 1972, pages 93-103.

SUMMARY OF THE INVENTION

Broadly, the present invention relates to a dynamic data correction generator for use in connection with a neighborhood transformation-type image analyzer system. The correction circuitry includes means for sensing the value of a central data point in a neighborhood matrix of points comprised of the central data point and its surrounding points in the matrix. A correction value associated with the sensed value of the central data point is added to the values of all of the data points in each neighborhood so that all of the adjusted data points in the neighborhood are within a particular range of values whereby the image analyzer system may accurately identify the data point in the neighborhood truly having the maximum value associated with this image.

The invention finds particular utility for accomodating "wrap around" of digital data signals derived from a scanner having an ambiguity interval less than the true range of values of points in the image being sensed. This "wrap around" phenomenon is often encountered by scanners having a limited number of possible output states, such states being generally limited by the number of bits in the output signal. For example, a scanner having an 8 bit output is limited to providing only up to 256 different values. Normally, the output signals of such scanners are based upon the difference of the phase relationship between a reference signal and the reflected signal from the scene. However, once the phase relationship gets over 360°, the output of the scanner must return to 0 and then progress upwardly again, i.e. "wrap around". The maximum digitized output value of such scanners is known as the ambiguity interval. Therefore, if the ambiguity interval is less than the range of sensed values of the points in the image, the wrap around phenomenon is encountered. Hence, the data point having a sensed value of 250 may in reality be less than a data point having a sensed value of 50. Accordingly, if the image analyzer system is interested in obtaining the maximum value in a neighborhood of points in the image, it ordinarily cannot obtain the true maximum point when the wrap around phenomenon has occured.

In the preferred embodiment, apparatus is provided for analyzing images represented by a serial stream of multibit digital data signals whose values correspond to characteristics of points in a matrix constituting the image. The analyzer system includes a chain of substantially identical neighborhood transformation stages, with each stage having an input for receiving the digital signals. Neighborhood extraction means are provided for temporarily storing a neighborhood in the matrix comprised of a central data point and its surrounding points in the matrix. A transformation generator portion includes neighborhood contribution circuitry for modifying the values of each point in the neighborhood. Maximum value selection means are utilized for selecting the maximum value associated with any of the contribution modified points in the neighborhood and providing said maximum value as the transformation output signal to the next stage. Dynamic data correction circuitry coupled to the neighborhood extraction portion senses the value of the central data point and adds a correction value associated with the sensed value of the central data point to the values of all of the contribution modified data points in the neighborhood so that they are within a particular range of values. Accordingly, the maximum value selection circuitry may accurately identify the data point in the neighborhood truly having the maximum value associated with the image.

BRIEF DESCRIPTION OF THE DRAWINGS

These and other objects and advantages of the present invention will become more apparent upon reading the following specification and by reference to the drawings in which:

FIGS. 15 (A–C) diagrammatically illustrates alternative examples of window configurations which can be utilized in 3-D transformations, with FIG. 15C illustrating an alternative arrangement of pixels in an input matrix;

FIGS. 16 (A–C) diagrammatically illustrates a 3-D elemental structuring element and its contribution values in dilation and erosion steps in a 3-D transformation, respectively;

FIG. 17 diagrammatically illustrates the use of a spherical primary structuring element to detect a particular object in the scene shown in FIG. 12.

DETAILED DESCRIPTION OF THE PREFERRED EMBODIMENTS

A. System Overview

Figure 1:
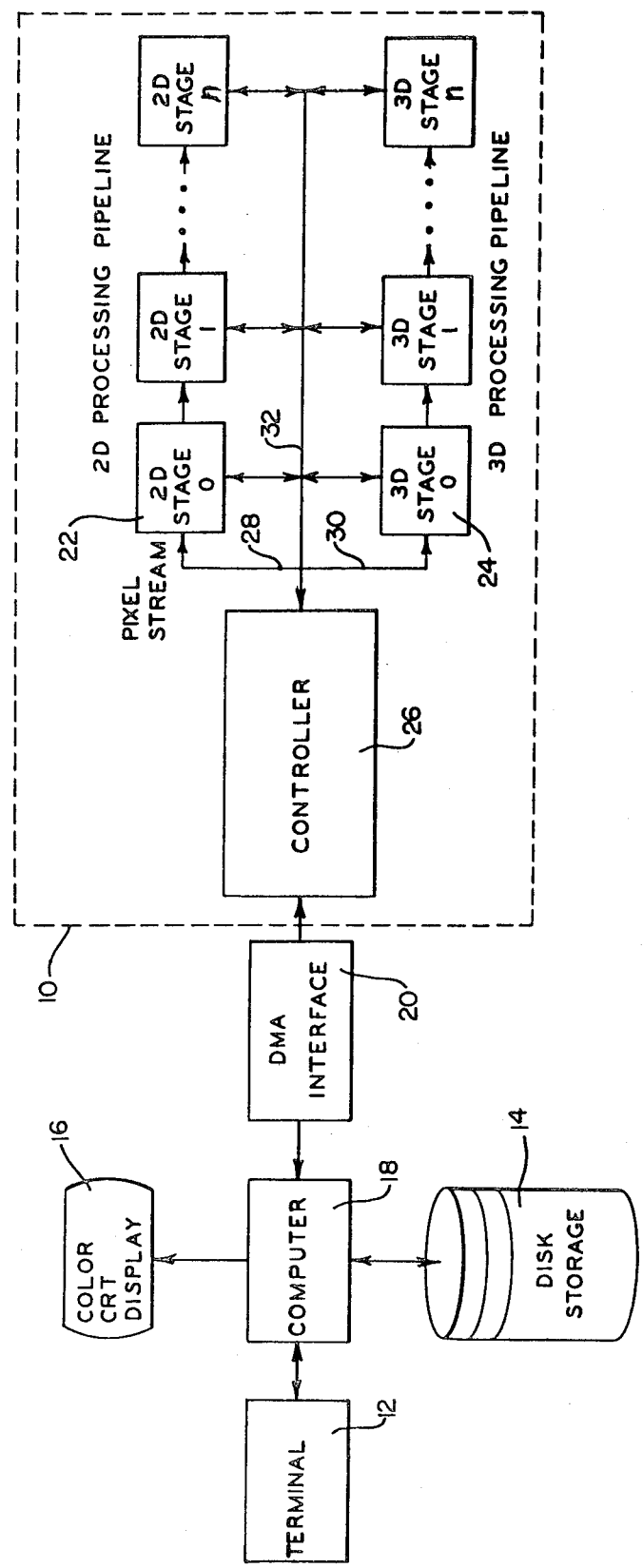
FIG. 1 is a block diagram of the major components of the system of the preferred embodiment of the present invention.

FIG. 1 shows the interconnection of the major components of the image analyzer system of the present invention. The system 10 interfaces with a plurality of peripheral devices such as keyboard terminal 12, disc storage device 14, and color cathode ray tube display 16, each communicating with a general purpose digital computer 18 such as a PDP 11/45 computer, manufactured by Digital Equipment Corporation. The disc storage device 14 may typically be used to store the digital signals representing the original image matrix under consideration, as well as for storing control instructions and other data.

Terminal 12 includes an alphanumeric keyboard and display which is manually accessible by an operator to control the functions of the system 10 during initial programming.

Display 16 may, among other things, be employed to provide a visual indication of the original image matrix as it undergoes a series of transformations in system 10. Direct memory access interface 20 provides efficient communication between system 10 and computer 18 in a manner well-known in the art.

System 10 includes a 2-dimensional processing pipeline consisting of a plurality of serially connected stages 22 which are substantially identical in structure. Similarly, the 3-dimensional processing pipeline portion of system 10 consists of a plurality of serially connected stages 24 which are substantially identical to one another. The input data stream representing the image matrix is routed either to the 2-D processing pipeline or 3-D processing pipeline through a central programmable source consisting of a controller 26 over data buses 28 or 30, respectively. Controller 26 may be a known microprocessor and is utilized to program the stages 22 and 24, as well as provide the necessary timing signals and data management as will be later discussed. Regardless of which pipeline is selected, each stage in the pipeline performs a single transformation on the entire image. Images are entered into the system in a line-scanned format and progress through the pipeline of the processing stages in real time. The output of the previous stage is coupled to the input of the subsequent stage such that, after an initial delay to fill the pipeline, image can be processed at the same rate that they are scanned.

The transformations carried out by the 2-D stages 22, and 3-D stages 24 are termed neighborhood transformations. It is deemed a neighborhood transformation because the output of the stage depends upon the values of data signals associated with a center cell and its surrounding points in the matrix (referred to as neighbors). The transformed image at each stage may be coupled to display 16 or other utilization devices over line 32 under appropriate direction from controller 26. For simplicity's sake, line 32 represents a combination control and address bus which is utilized to address the individual stages for selectively altering the type of transformation at each stage and for reading out the resultant transformed image.

B. 2-D Stage Overview

Figure 2:
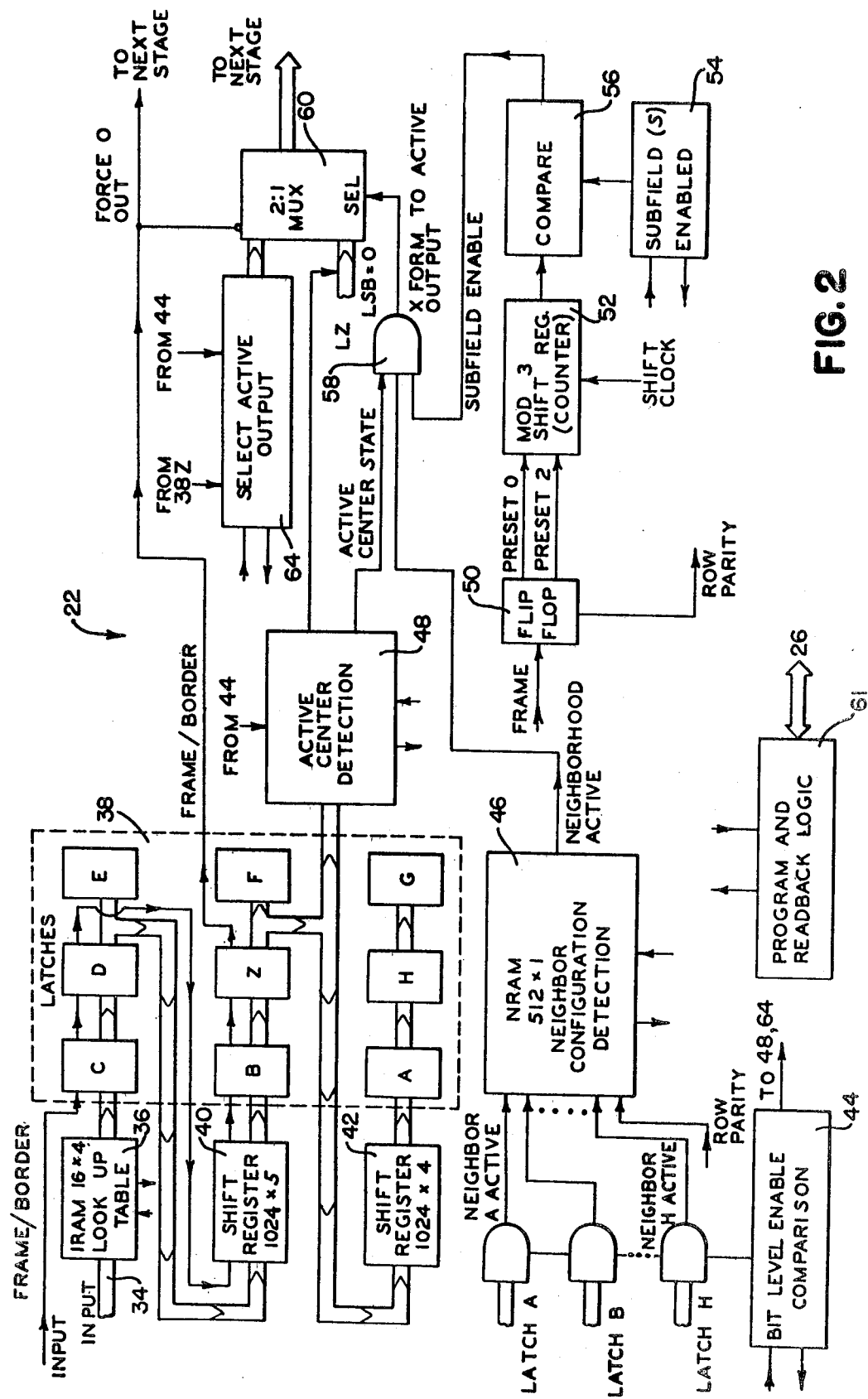
FIG. 2 is a block diagram of a 2-D transformation stage utilized in the system of FIG. 1.

Referring now to FIG. 2, there is shown a block diagram of the major components of the 2-D stage 22. Each stage 22 is identical and, therefore, a description of only one stage will suffice. Image data is received from the preceding stage over line 34. In this embodiment, the binary data is carried on four separate lines such that the data can be represented in $2^4$ or 16 different states. Typically, the original image matrix in a 2-dimensional environment is represented in only two binary states, i.e. ones and zeroes. However, the transformation in each stage can increase or decrease the number of states to a maximum of 16 different states depending upon the type of transformation.

Each pixel in the incoming data stream may be modified by the input lookup random access memory (IRAM) 36. IRAM table 36 is loaded during the initial programming phase by controller 26. The function of IRAM 36 is to assign selected ones of the incoming data bits to a particular state or value. The assigned state will depend upon the value of the incoming data and the neighborhood pattern to be detected and analyzed in that stage. In this particular embodiment, IRAM 36 assigns a particular state value to all "active" neighbors and centers. An "active" neighbor is a data point in the matrix surrounding a center cell which is of interest in performing the transformation at the particular stage in question. Likewise, a data point is considered an "active center" if its value is important in determining the type of transformation to be performed in the stage with respect to the center cell. One purpose of this initial state assignment is to enhance the power of the combinational logic used in the transformation. It also allows multiple states of the image pixel to be "carried along" and utilized later by another stage.

In addition, any non-neighborhood (point-by-point) logical function can be implemented, such as scaling or slicing. By way of a specific example, assume that data points having values of 1, 7, 15, and 16 are of interest as neighbors in a particular stage. Controller 26 loads the value 1 into memory locations 1, 7, 15, and 16 into IRAM 36 with the other locations being loaded with other values. Each 4-bit data signal in the incoming stream is used as an address to access IRAM 36 such that all data signals having the values 1, 7, 15 and 16 are converted to 1's whereas data signals with other values are not. In this specific example, "active neighbors" are assigned state 1, "active centers" are assigned state 1 or 2, "active outputs" generated in the previous stage are changed to the desired resultant state; and "active neighbor and active center" assignments made in the previous stage are reversed. Of course, this is a simplified example and the scope of the invention should not be so limited.

Neighborhood extraction portion 38 of the stage consists, in this embodiment, of nine serially connected latches A-H and Z. Each data point or pixel is shifted through the latches of extraction portion 38 so that each neighborhood in the input matrix is sequentially accessed. The pixels in latches C, D, and E take part, as neighbors, in the transformation operation of the pixel in the center latch Z. These pixels then enter line shift register 40 whose length depends upon the type of raster scan matrix utilized. After leaving shift register 40, the pixel in latch B serves as a neighbor in the neighborhood transformation of the pixel in the subsequent latch. Then it is shifted to center cell Z where it becomes the center cell of the transformation. The original state of the pixel is shifted through latch F, shift register 42, and latches A, H and G where it again forms part of the neighborhood for the transformations of other center cells, after which it is discarded.

The collection of neighborhood pixels which qualify as "active" neighbors forms an 8 bit vector which is used, along with a row parity bit, as an address into a neighborhood lookup random access memory (NRAM) 46. The output from neighborhood configuration detector 46 is true and provides an output of 1 only if the configuration of the active neighbors meets a predefined pattern of interest, hereinafter referred to as a structuring pattern, which is programmed by the central controller 26.

The center pixel in latch Z is tested by detector 48 to determine if it is an "active" center. In the preferred embodiment, an active center value is either a 1 or 2 as selected by IRAM 36. In this example, a value of one allows the active center state to be the same as an active neighbor, while the value of 2 allows the two to be different.

In some operations, only a portion of the pixels in a scene are considered for transformation. The pixels in a line are numbered sequentially in each line as represented by the position in the extraction portion 38. The subfield(s) to be considered are also preselected by the central controller 26 for each stage and stored in storage device 54. If the center pixel is in this preselected subfield as detected by comparator 56, the condition is defined as "subfield enable" and an output signal signifying this condition is provided.

An extra bit is also carried along with each pixel to identify the border pixels in the frame, thus preventing data "spill-over" from the end of one line to the start of the next, and vice-versa.

The comparison by AND gate 58 of the "neighborhood active", "subfield enabled", and "active center", signals produces a transformation. If any of these conditions are not met, the state of the center pixel will be passed along unmodified to the next stage in the pipeline by multiplexer 60. If all conditions are met, the output from AND gate 58 switches multiplexer 60 to provide an "active output" of a preselected or transformed value at its output which is passed to the next stage's input.

As noted before, the state of each pixel is represented in 4 bits, or 16 states overall. In any stage, however, a subset of the 4 bits may be used for each operation (active center, active neighbor, etc.) The least significant bit is always used and any combination of the other bits may be enabled. This is programmed into bit level enable circuitry 44 via controller 26, which determines the bits selected for utilization in the stage. In this way, either unique binary images may be maintained in the disabled bits and/or multiple, unique states may qualify in each hardware comparison of active center or active neighbor states. This will allow the programming of more sophisticated transformation functions in the hardware of each stage. If any bits are not enabled for comparison, they are passed unmodified to the next stage, regardless of an active output condition.

C. 3-D Stage Overview

Figure 3:
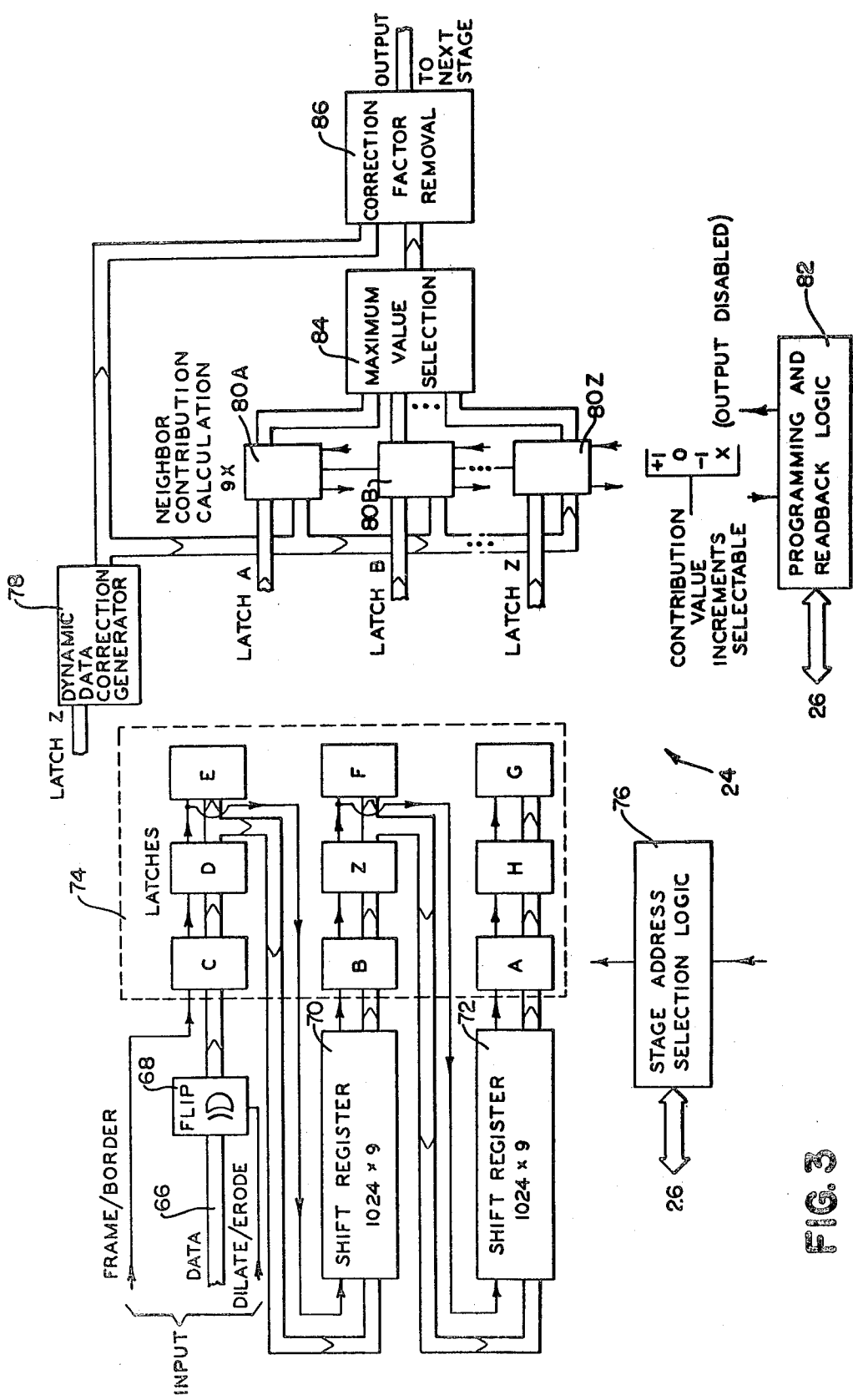
FIG. 3 is a block diagram of a 3-D transformation stage utilized in the system of FIG. 1.

FIG. 3 shows the major components of the 3-D stage module 24. In the 3-D processing example of this invention, the input data stream is in the form of a series of 8 bit words, each word representing a characteristic of a pixel in the original image matrix, such as its gray level. The input data is carried over eight lines and entered from the preceding module on data line 66. A dilate/erode control circuit 68 may modify the incoming data depending upon the type of transformation desired in that particular stage or group of stages by a control signal which is supplied by the central controller 26. For example, if a group of stages are to perform dilation transformations circuit 68 proceeds to pass the input data unaffected whereas in the erosion mode, circuit 68 proceeds to form the logical implement of the data signals in the first stage of the goup performing the erosion transformations. If the next group of stages are to perform dilation transformations, the control circuit 68 may be activated in the first stage of this group to effectively return the data back to its noncomplemented form. In this embodiment, circuit 68 is an exclusive-OR gate network having one input coupled to data line 66 and another input coupled to controller 26 via programming and read back logic 82. If controller 26 places a logical one signal to an input of circuit 68, all logical ones in the input data become zero and zeroes become ones. In contrast, the data is unaffected if controller 26 places a logical zero at the input. Depending upon the logic convention used, the control circuit 68 may conversely modify the data when dilation is to be effected in the stage as compared to erosion.

The input data is then clocked through latches C, D, E, shift register 70, latches B, Z, and F, shift register 72, and latches A, H, and G, much in the same manner as described in connection with the 2-D stage 22. Accordingly, the latches make up the neighborhood extraction portion 74 of the stage 24 which sequentially accesses each neighborhood in the input matrix. Stage address selection logic 76 coupled to controller 26 serves to address the particular stage for control purposes.

The transformation circuitry for the 3-D stage is shown in the righthand portion of FIG. 3. The center cell latch Z is coupled to dynamic data generator 78 which senses the value of the data in the center cell and provides a correction factor to the neighborhood values to aid in the transformation as will later be discussed more fully herein.

The output of generator 78 is coupled, along with the outputs of neighborhood latches A-H and Z to neighborhood contribution calculation devices 80 (A-H and Z) which add neighborhood contributions to the 8 bit values stored in the latches as modified by the correction factor. Each neighborhood contribution device 80 is coupled to controller 26 via programming and readback logic 82 which selectively provides a contribution value to each of the devices 80. As diagrammatically shown in FIG. 3, the contribution values are either +1 (which adds the value 1), the value of zero (no change), a value of −1 (which substracts the value of −1) or x (which disables the output of device 80).

The outputs of the neighborhood contribution calculation devices 80 are coupled to the input of a maximum value selection circuitry 84. The purpose of maximum value selection circuitry 84 is to select the maximum output from devices 80. For example, if the output of device 80A is 60, whereas the remaining outputs of devices 80 (B-H and Z) are less than 60 or disabled, maximum value selection circuitry 84 will provide a 60 value at its output. This output and the output of generator 78 are coupled to circuitry 86 which removes the previously applied correction factor before the transformed output is given to the next stage.

Consequently, each neighborhood in the matrix is sequentially accessed by neighborhood extraction circuitry 74, with the stage 24 providing a transformed output to the next stage depending upon the contribution values selectively applied to devices 80 by controller 26.

D. 2-D Stage Detailed Description

FIG. 4 shows a detailed schematic of the components of 2-D stage 22 which are shown in functional block diagram form in FIG. 2. The logic circuitry making up each functional component block is circumscribed by dotted lines in FIG. 4. Reference to the detailed schematic of FIG. 4 coupled with a description of the 2-D stage previously set forth should enable one skilled in the art to make and use the invention. A detailed description of the component to component interconnections herein is thus not warranted. In general, the input/output arrows represent timing and control inputs from controller 26 via I/O and address selector networks including control registers, data buses, and buffer interfaces in a manner known in the art.

Lookup table 36 includes a random access memory 100 having its data lines coupled to controller 26. The address lines to memory 100 are coupled to the output of a selector 102 having two sets of inputs, one from input line 34 and the other from controller 26. During the programming phase, controller 26 places an appropriate signal on line 104 to place the desired data into memory 100 at the address locations selected. During the transformation phase, the data on input line 34 is coupled through selector 102 to form an address for accessing the contents of memory 100. In this embodiment, memory 100 forms a 16×4 lookup table such that selected ones of the 4 bits data signals are converted to other states depending upon their input values as noted above.

The output from table 36 is coupled to a plurality of series connected latches formed of known flip-flops comprising the neighborhood extraction portion 38. The data signals are shifted through flip-flops 38A-38H and 38Z, as well as register 108 forming delay shift registers 40 and 42 under the timing of clock pulses on line 110 and 112 from controller 26. Hence, once the flip-flops 38 and register 108 are filled, all of the neighborhoods in the matrix are sequentially accessed and are temporarily stored in flip-flops 38 such that a transformation is made, if desired, for each neighborhood.

Figure 4A:
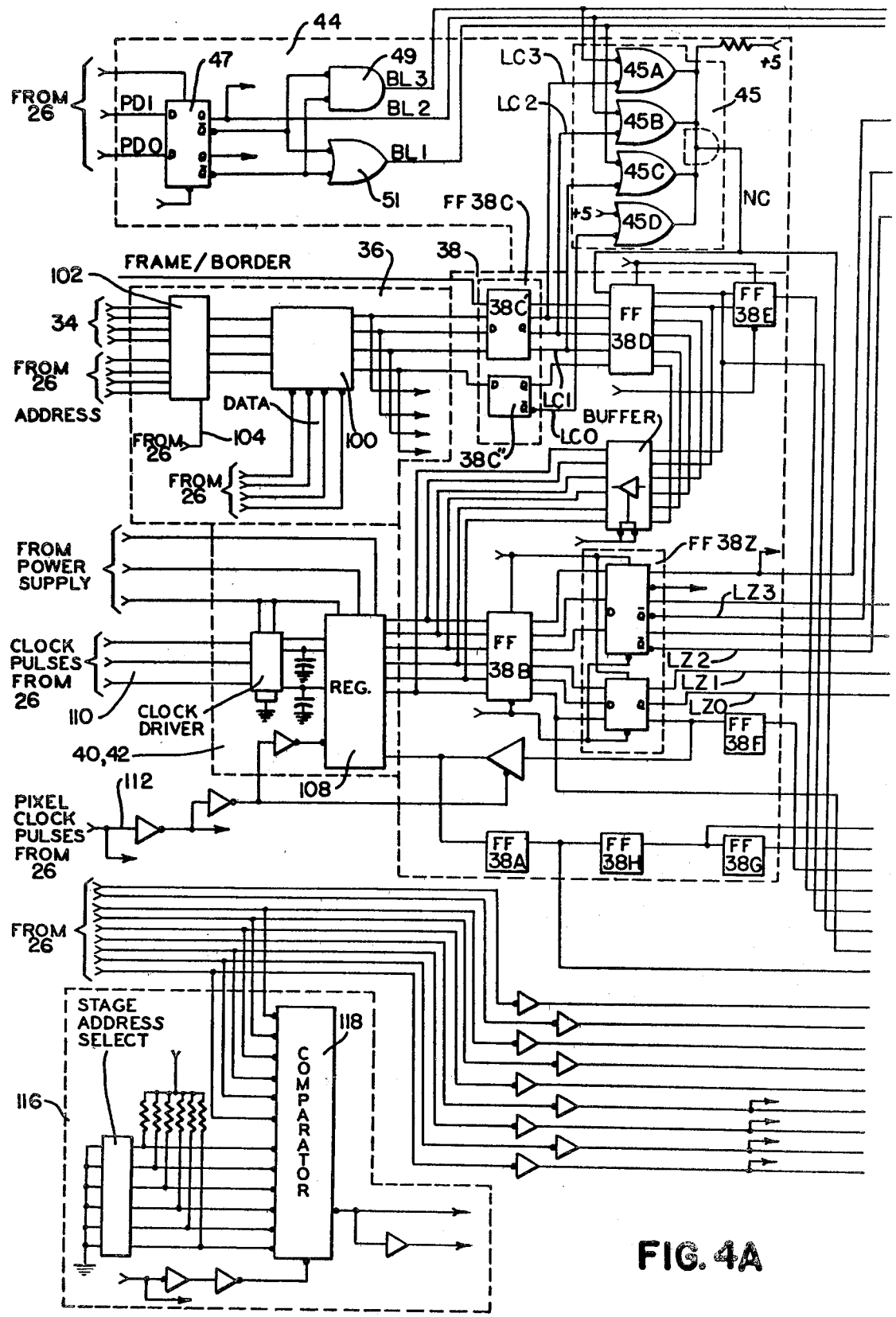
FIGS. 4 (A–C) is a detailed schematic of the 2-D stage shown in block diagram form in FIG. 2.

The outputs of flip-flops 38 are coupled to a selector 114 (FIG. 4B) having two sets of inputs. One set is from flip-flops 38 whereas another set of inputs is from controller 26 through stage selection circuitry 116 (FIG. 4A). As known in the art, stage selection of circuitry 116 has a preprogrammed access address which is coupled to comparator 118 which in turn is coupled to the address lines from controller 26. If the address from controller 26 matches the programmed address of the stage, appropriate enabling signals are provided so that the addressed stage can be programmed. During the programming stage, neighborhood configuration detector 46 is programmed by controller 26 so that particular member locations contain an appropriate value, thereby indicating that the neighborhood contained by flip-flops 38A-H is in a particular configuration. By way of a simplified example, assume that the particular stage is interested in all neighborhoods which have a certain value in all of its neighbor locations but is not interested in other pattern configurations. If the neighborhood contains this configuration each of the flip-flops 38 A-H will be in the high state. The combined outputs are used as an address to access the random access memory of neighborhood configuration detector 46. Thus, controller 26 will have previously located a value of 1 in address memory location 377 OCTAL. Hence, if all of the neighborhood latches are high, NRAM 46 will provide a logical 1 output on line 120, indicating that the neighborhood is active, i.e. that the neighborhood has a particular pattern configuration. Otherwise, the output on line 120 will be low, thereby indicating that the neighborhood does not contain the desired pattern under consideration.

Figure 4B:
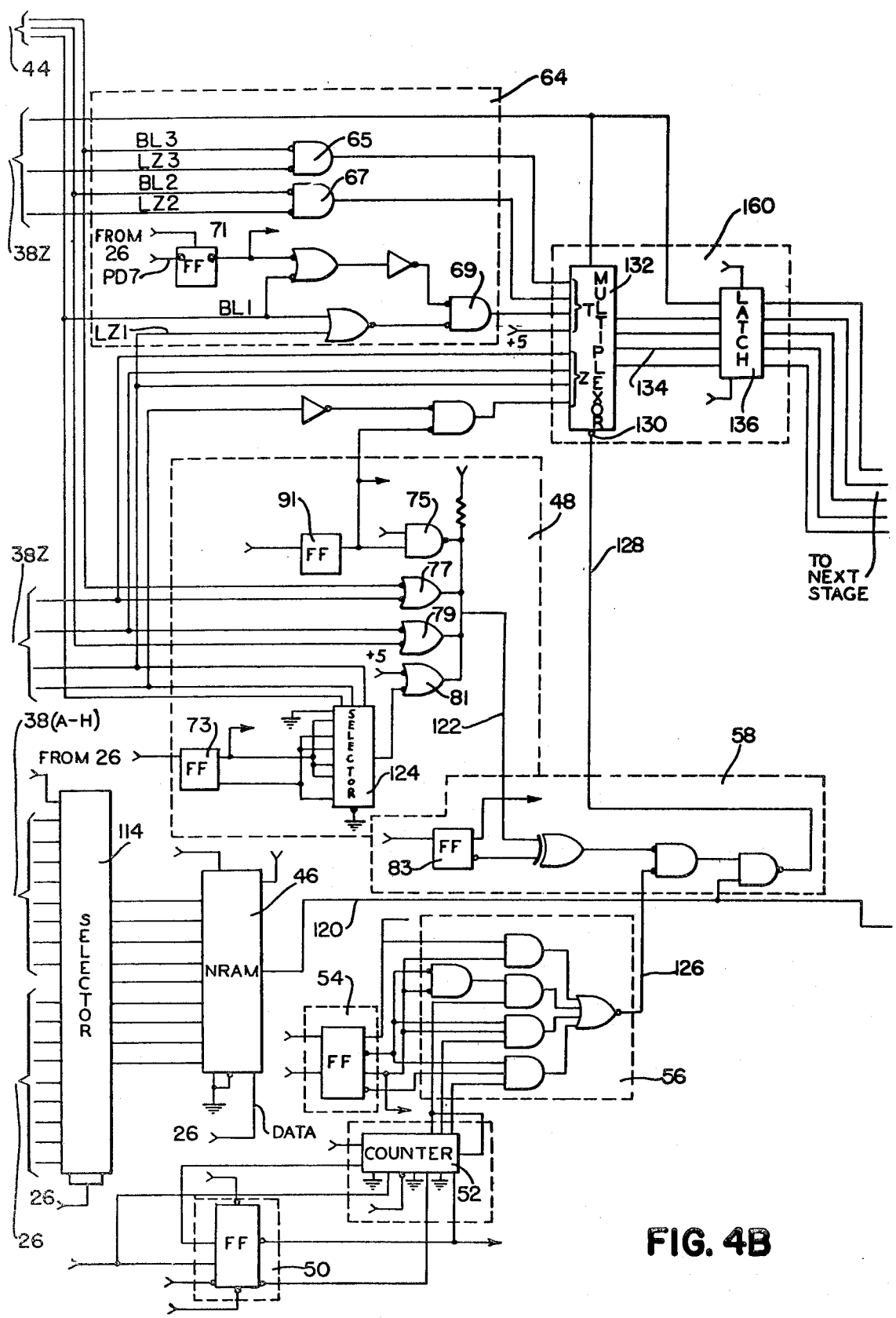

The output of latch 38Z which contains the center cell in the neighborhood of the neighborhood extraction means 38 is coupled to active center detection circuitry 48 (FIG. 4B). Circuitry 48 and the logic gates therein senses the 4-bit value in latch 38Z to determine whether the conditions are right to execute a transform. By way of a simplified example, assume that if the value in latch 38Z is zero there is no transform to be made, wherein if the value is one a transform is to be generated. If the conditions are met as detected by gates 75, 77, 79, and 81, line 122 provides a high output signal indicating such. By placing appropriate signals on the inputs to flip-flops 73, 83, and 91 a variety of different conditions can be examined. For example, a high signal on the input to flip-flop 91 will result in an active output or high level on line 122 regardless of the value in the center cell latch 38Z. If a high level is also placed on the input to flip-flop 83, a transformation will never occur. Depending upon the signal level to flip-flop 73, a 1 or 2 level in latch 38Z will be examined. Other conditions and their logical implementation will be obvious to one skilled in the art.

In some instances only certain pixels in the data matrix are of interest, i.e. those pixels in pre-selected portions of the data matrix called subfields. The subfield detection network accepts control signals from controller 26 which determines which subfield is of interest in the particular stage. If the subfield is enabled line 126 from comparator 56 provides an output signal indicating this condition.

The outputs from neighborhood configuration detector line 120, active center detection line 122 and subfield enable line 126 are all coupled to comparator circuitry 58 (FIG. 4B). If all of the conditions are met, comparator 58 provides a high output on line 128 indicating such. Line 128 is coupled to the control input 130 of multiplexor 132. Multiplexor 132 is a known 2:1 type multiplexor which switches one of two inputs to its output 134 depending upon the state of the signal at its control input 130. In this embodiment one input (Z) is coupled to the center cell latch 38Z whereas another input (T) is coupled to controller 26 through circuit components in selection circuitry 64 which provides a particular transformation value. This value is programmed from controller 26 and may vary from stage to stage. In this specific example, the transformation value is either one or three. Hence, if all of the transformation conditions are met as indicated by an appropriate signal on line 128, multiplexor 132 will couple the transformation value from circuitry 64 to its output 134. Otherwise, the value in the center cell latch 38Z will be passed to the output 134 of multiplexor 132. The output of multiplexor 132 is coupled to latch 136 which feeds the output to the next stage 22 at the appropriate clock time.

Figure 4C:
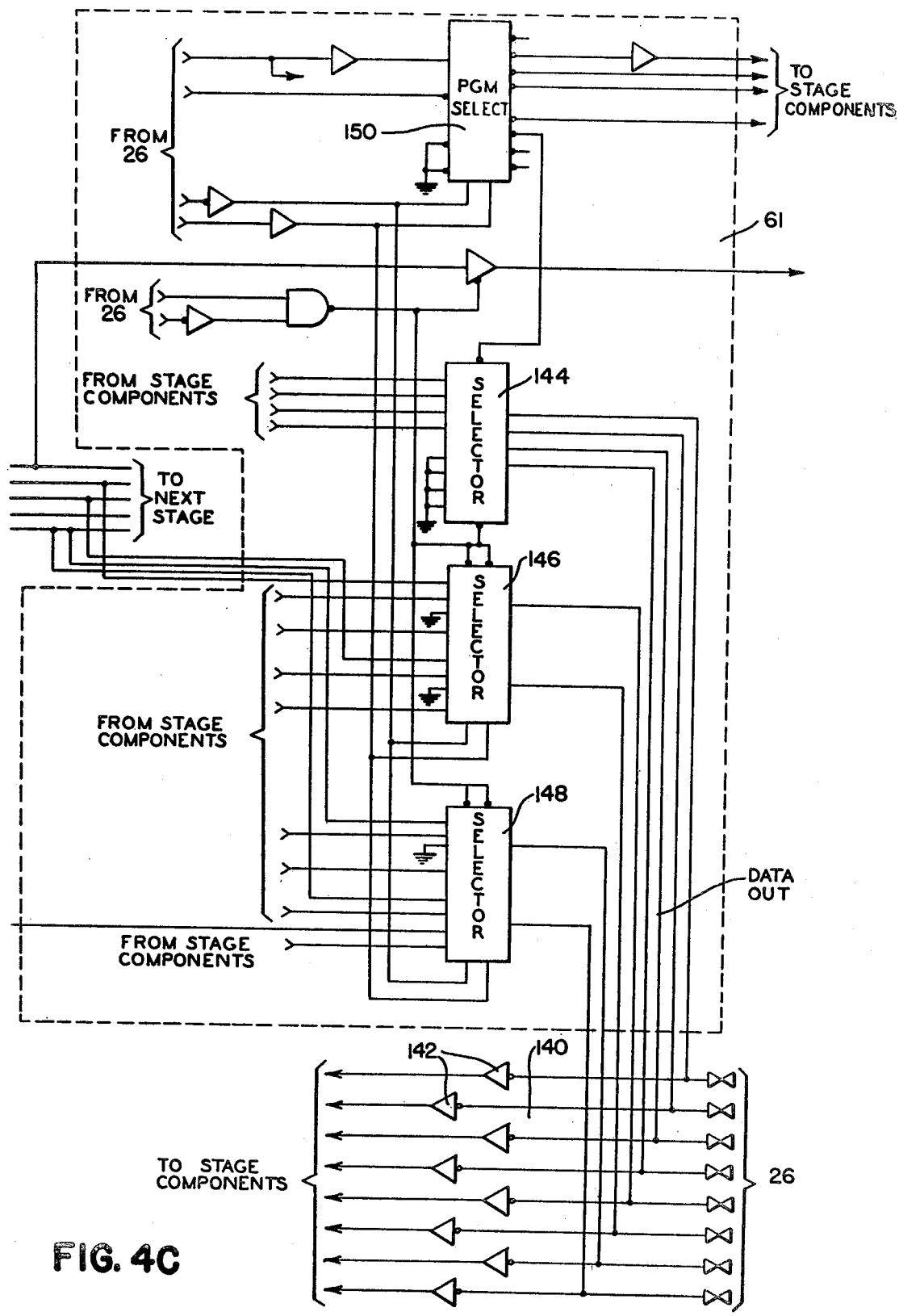

Program and readback logic 61 as shown in FIG. 4C includes a multi-bit bi-directional data bus 140 which communicates with controller 26 in a manner known in the art. Briefly, buffers 142 permit data flow from controller 26 to the stage components for programming of various components. In the transform mode data flows out of the stage to controller 26 in a timed sequence determined by selectors 144-148. In such manner, controller 26 may selectively monitor the output of each stage in the 2-D pipeline. Program selector 150, under the control of controller 26, is used to selectively address control registers in the stage.

Hence, the 2-D stage 22 provides an efficient circuit network for detecting the presence of a particular pattern in each neighborhood of the input matrix and provides a transformed output to the next stage if said pattern is present. Since each stage is coupled to a central controller 26, the analysis in each stage may differ even though the hardware is exactly the same in each stage.

E. Bit Level Enable

It is a feature of this invention that if desired, only selected bits of the incoming data stream need be utilized in the above-described transformation process. By selectively enabling or disabling the bits of the data signals, either unique binary images may be maintained in the disabled bits and/or multiple unique states may qualify for use in each hardware comparison of the active center or active neighborhood states. For example, the most significant bit of the incoming data stream may be representative of a particular image configuration which in turn can be shown as a selected color on the color cathode ray tube display 16.

This aspect of the invention is more easily understood by way of a specific example. Turn then to FIG. 4A and assume that the output value from IRAM memory 100 is 9 represented by the binary value 1001. Assume further that it is desired to disable the most significant bit. The data signal is latched into latch 38C. The $\overline{Q}$ output of flip-flop 38C" will thus be 0 on line LC0. Progressing upwardly, the outputs LC1, LC2, LC3 of flip-flop 38C" will be 0, 0, 1, respectively, with the uppermost line containing a frame bit which is of no particular importance in this example. These output lines are coupled to detection circuitry 45 comprised of parallel coupled OR-gates having their inputs inverted. One input of gate 45A is coupled to the most significant bit on line LC3, one input of gate 45B being coupled to the next most significant bit on line LC2, one input of gate 45C being coupled to the third most significant bit on line LC1, with one input to gate 45D being coupled to the least significant bit on line LC0.

Flip-flop 47 comprises a dual latch having two separate inputs PD1 and PD0 which are coupled to controller 26. In our example, controller 26 places a 0 on line PD0 and a 1 on line PD1. The connection of logical gates 49 and 51 thus provides a 0, 1, 1 level on lines BL3, BL2, and BL1, respectively. Line BL1 is coupled to the other input of gate 45C, line BL2 is coupled to the other input of gate 45B, and line BL3 is coupled to the other input of gate 45A. Gates 45A-D will provide a high or logical 1 output if there is a 0 on either of its inputs. Thus, detector 45 will provide a logical 1 output on line NC indicating that this digital signal of the value 9 qualifies as an active neighbor. Note, that if line BL3 was in a 1 state, the value 9 would not qualify as an active neighbor and the output of detector 45 would be 0. The output of detector 45 is coupled to the flip-flops comprising the remaining latches of neighborhood extraction portion 38 and is sequentially shifted therethrough to indicate that the particular digital signal qualifies as an active neighbor. The value 9, however, of the digital signal is saved so that when it becomes part of the center cell latch 38Z, its value is used in the output selector network 64 (FIG. 4B). Decisional logic gates 65, 67, and 69 each have one input coupled to bit level enable circuitry 44 and another input coupled to center cell latch 38Z. Gate 65 controls the decision of the most significant bit, gate 67 the next most significant bit, and 69 the next to least most significant bit. In our specific example, line BL3 would be low (signifying a disabled state) and LZ3 would be high. The output of gate 65 would thus be high. Each of the gates 65, 67, and 69 will pass the state of the bit in the center cell latch 38Z if the associated bit enable line is low. The flip-flop 71 and the circuitry associated with the next to least most significant bit is provided in the preferred embodiment to change the transformation output between 1 and 3 depending upon the state of the signal on line PD7 from controller 26 (a state of 1 providing a value of 1).

The outputs from gates 65, 67, and 69 are coupled to one input, the transformation input T, of multiplexor 132. Note that the least significant bit line is prewired to a high state. In our specific example, the states of the input lines to the T multiplexor input would be 1011, assuming a 3 transformation output has been programmed by controller 26. Thus, if a signal on line 128 is received, indicating that the conditions are right for a transformation, the T multiplexor input is coupled to multiplexor output lines 134. Otherwise, the value of the center cell latch Z will be connected to the multiplexor output. However, even in the event of a transformation, the multiplexor output will contain the unmodified states of all disabled bits. In the event of no transformation, of course, none of the bits are modified. In our specific example, the most significant bit, which was disabled by bit level enable circuitry 44, is passed on unmodified, i.e., as state 1, to the next stage. Note also that the bit enable lines are also coupled to active center detection circuitry 48 for performing substantially the same function as described above in connection with selector 64.

All of the bits excluding the least significant bit of incoming data signal or selected portions thereof, can be thus enabled or disabled depending upon the states of the input signals on lines PD0 and PD1 from controller 26 (FIG. 4A). Control signals having states of 00 will enable the least significant bit only, state 01 enabling the two most least significant bits, states 10 enabling the three least most significant bits (as in our example) and states 11 enabling all of the bits of the incoming data signal.

F. 3-D Stage Detailed Description

Figure 5A:
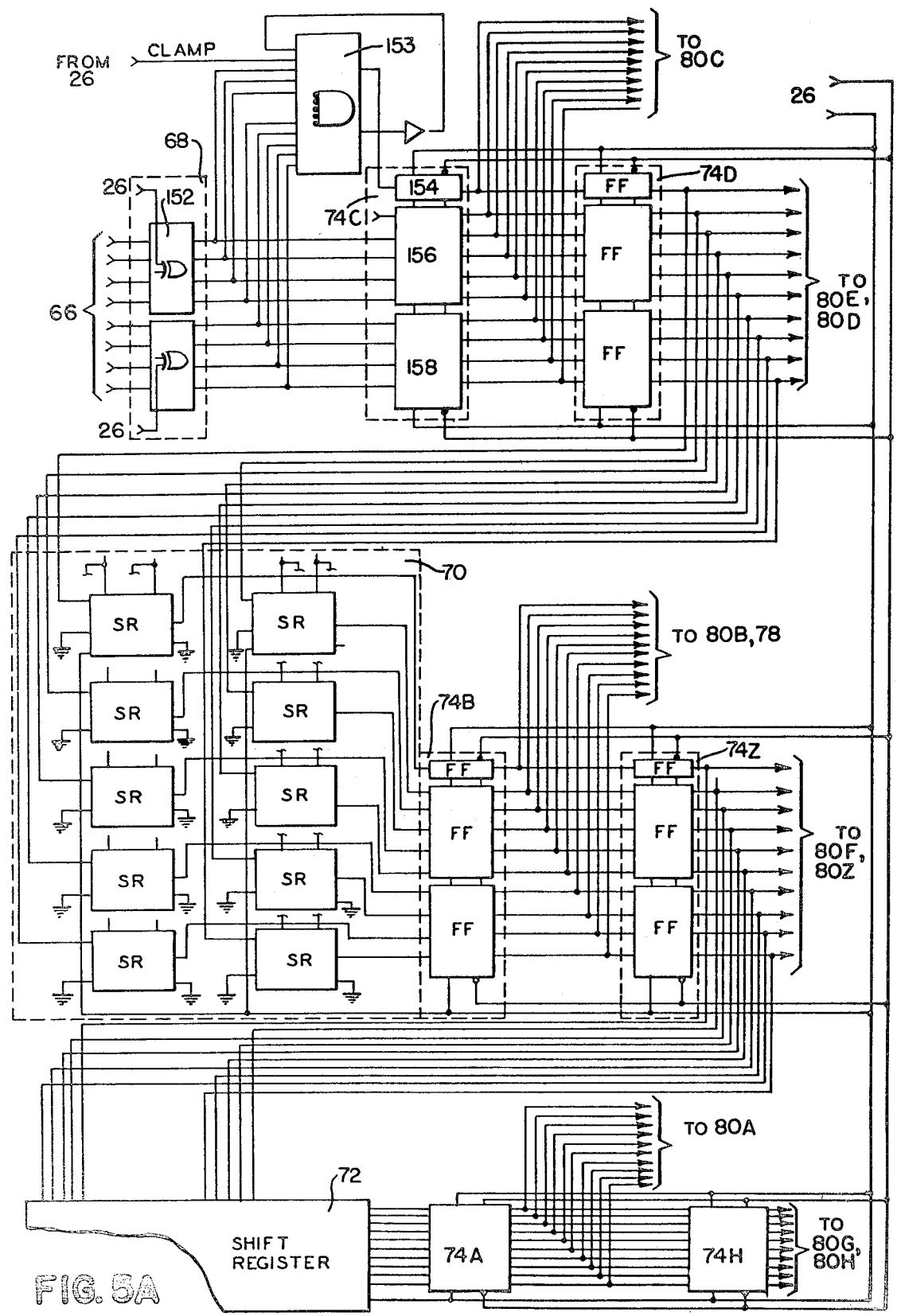
FIGS. 5 (A–C) is a detailed schematic of the neighborhood extraction and contribution calculation portions of the 3-D stage shown in block diagram form in FIG. 3.

Turning now to FIG. 5, there is shown a detailed schematic of the neighborhood extraction portion 74 and neighorhood contribution calculation portion 80. Again, the drawings are substantially self-explanatory and the details of the interconnections, along with their timing components and the line would not be necessary to enable one skilled in the art to make and use the invention.

In the 3-D mode, the data is carried on eight input lines 66. Line 66 is coupled to erosion/dilation control circuitry 68. Circuitry 68 comprises a plurality of exclusive OR gates 152, with each gate having two inputs; one of the inputs being coupled to controller 26, with the other input being coupled to one of the data lines. Upon placing an appropriate signal, for example, a high level from controller 26 on one input of gates 152, the logical complement of the input data will be formed as discussed above.

The output of circuitry 68 is coupled to eight bit latches 74A-H and 74Z which comprises the neighborhood extraction portion 74. Each of the latches 74 are substantially identical and in this embodiment include three discrete flip-flop components 154-158, with appropriate timing signals being supplied by controller 26 in a manner known in the art. In this example, there are no discrete components forming latches 74E, 74F, and 74G. In order to save component costs and improve timing efficiency, the outputs of latches 74D, 74Z, and 74H, are coupled to circuit portions 80E, 80F, and 80G in the neighborhood contribution calculation portion circuitry, respectively, as well as to their corresponding circuit portions 80D, 80Z, and 80H, respectively. Shift registers 70 and 72 are comprised of known multi-bit shift registers of a length necessary to accomodate for the pixel number in the raster scan in a manner known in the art. Consequently, the input data is shifted through the latches comprising the neighborhood extraction portion 74 so that each neighborhood in the matrix is sequentially accessed.

Figure 5B:
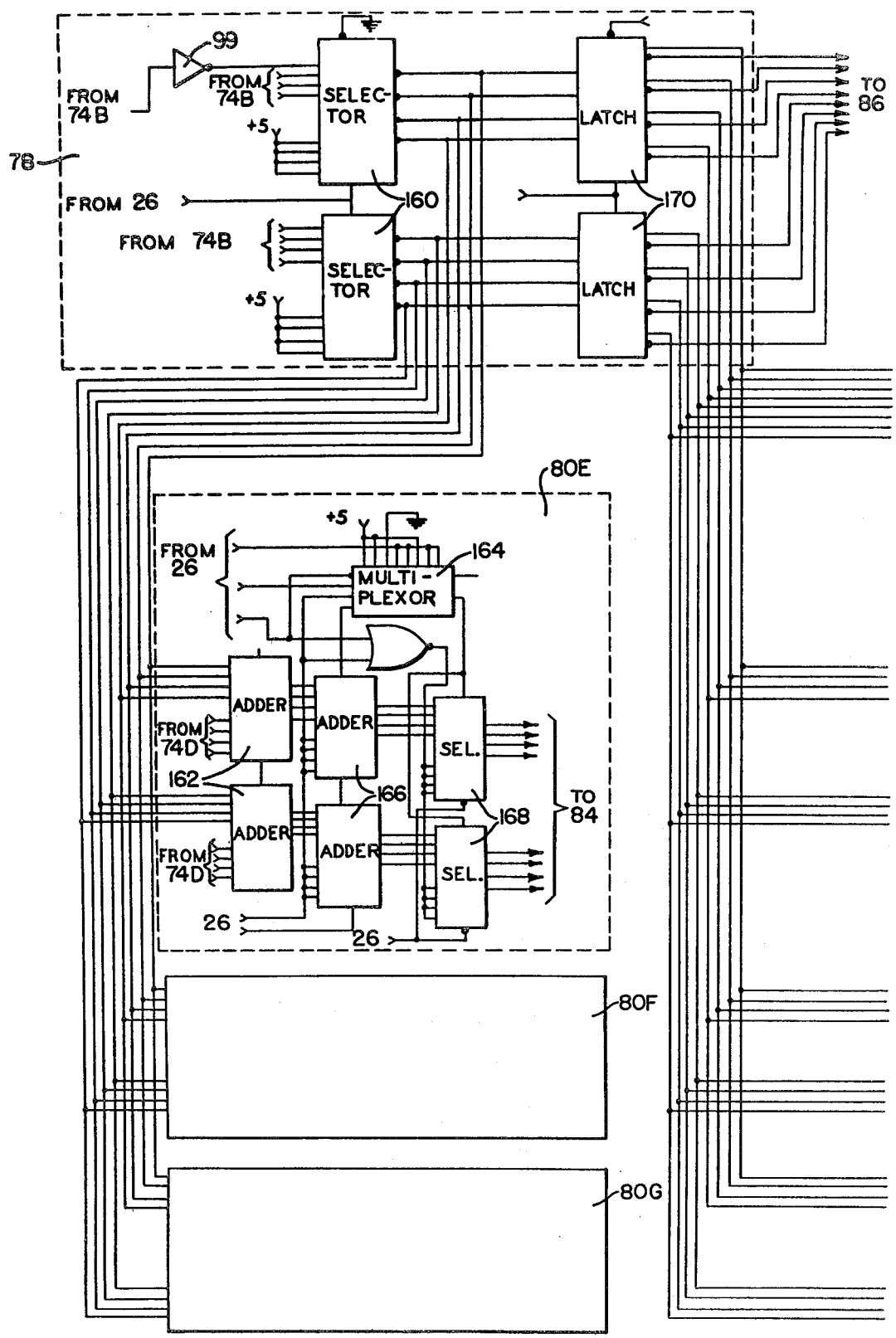
Figure 5C:
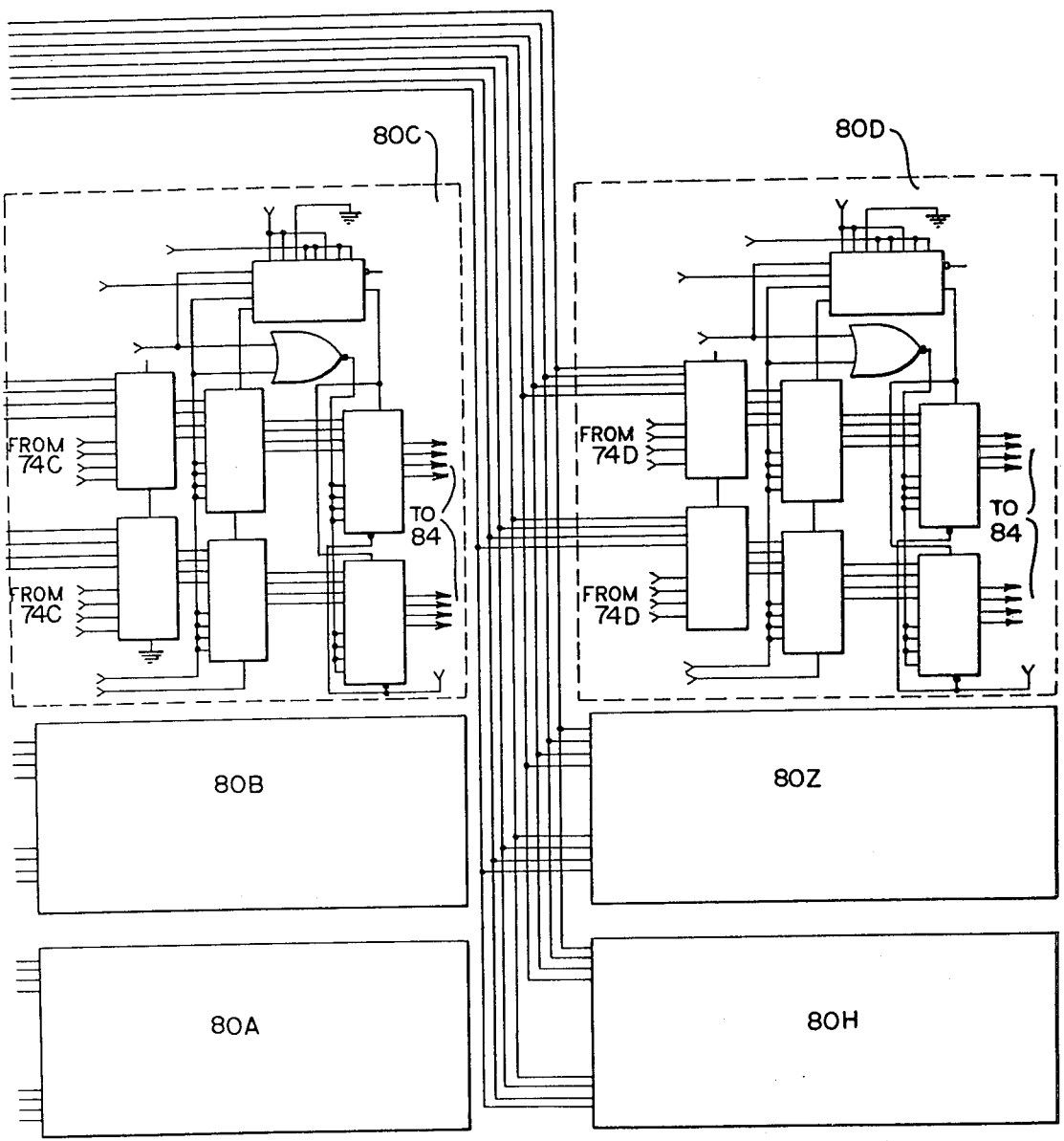
Figure 6A:
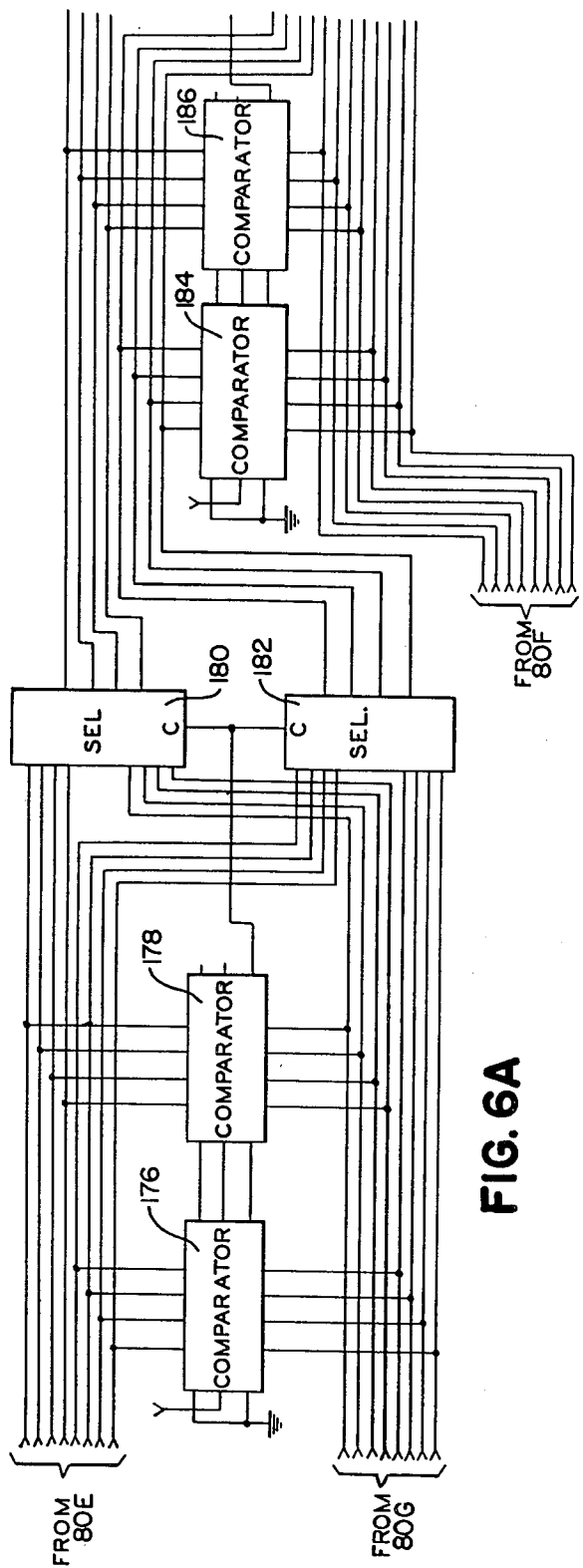
FIGS. 6 (A–D) is a detailed schematic of the maximum value selection portion of the 3-D stage, with FIG. 6D showing the organization of FIGS. 6A–6C.
Figure 6A:
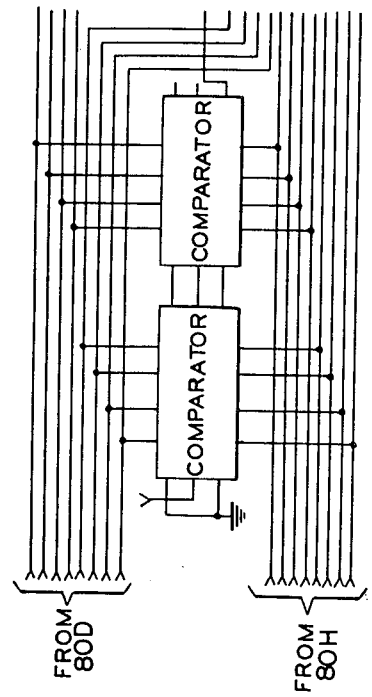
Figure 6B:
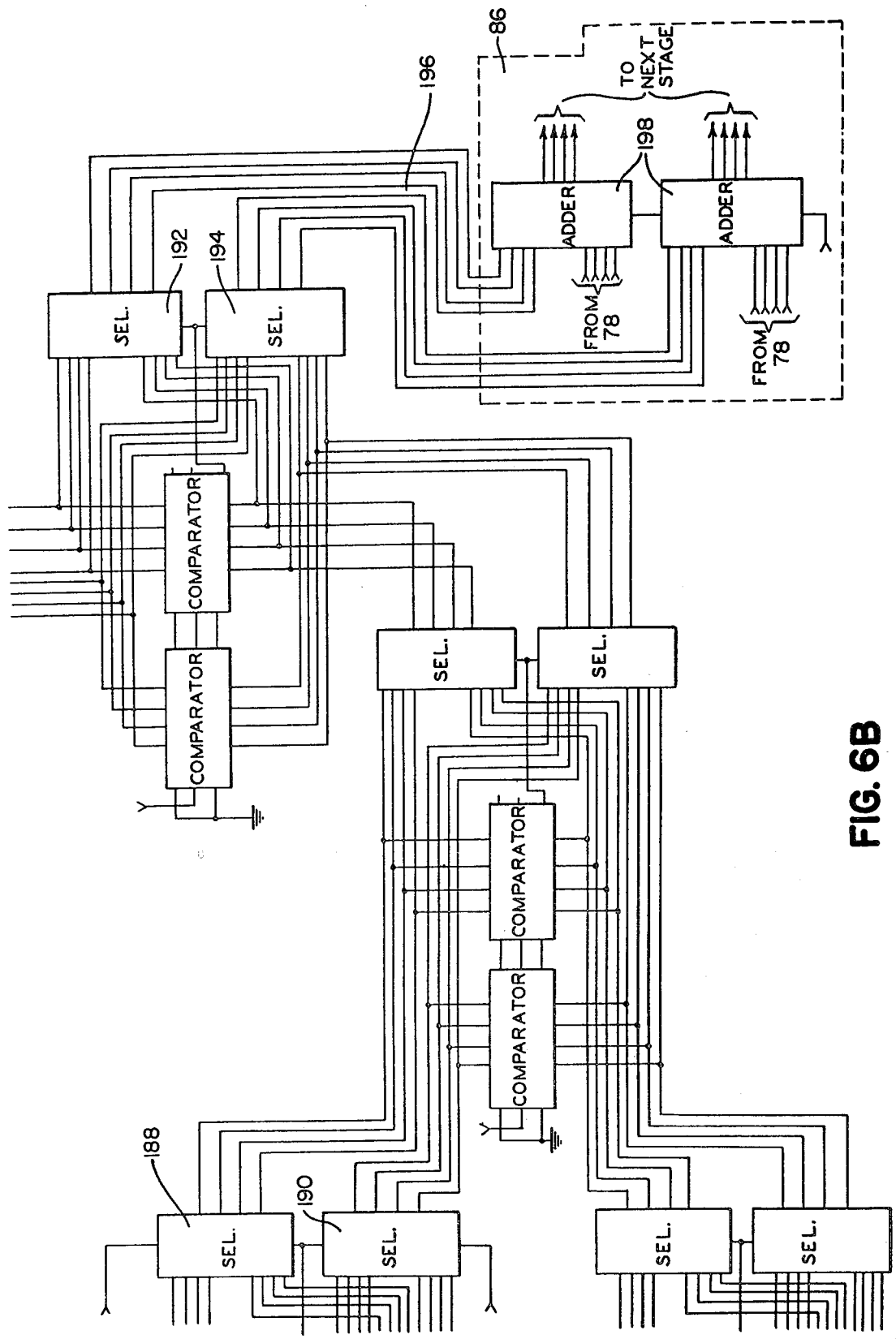
Figure 6C:
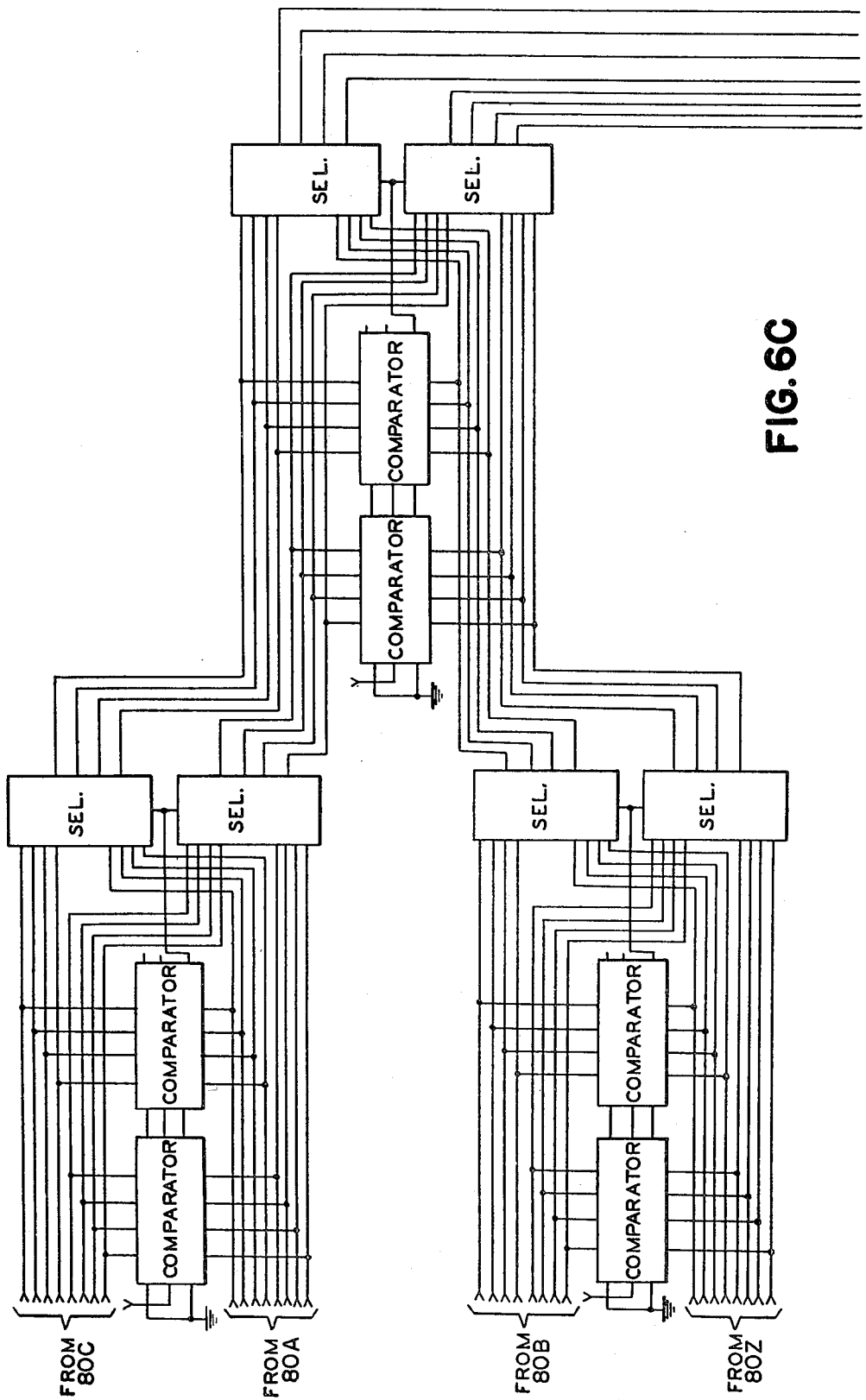

Turning now to FIGS. 5B and 5C, the neighborhood contribution calculation portion 80 will now be described. Upon receiving an enabling signal from controller 26, generator circuitry 78 senses the value in the center cell latch and generates a correction value. More specifically, in this embodiment the inputs to selectors 160 are coupled to the output of latch 74B instead of center cell latch 74C since the neighborhood contribution calculation for calculation network portions 80E, 80F, and 80G will take place one time step before the remaining networks associated with latches 74C, 74D, 74B, 74Z, 74A, and 74H. The generation of this correction value will be described more fully later herein.

During the first time step, this correction value is added by adders 162 in networks 80E, 80F, and 80G. Each of these networks are identical and thus only one will be described in detail. The combined output of adders 162 thus represents the corrected value of the pixel associated with one of the neighborhood locations. Controller 26 provides a contribution value to adders 166. Adders 166 combine the contribution increment with the output of adders 162. As noted before, the contribution increment value may be $-1$, 0, or $+1$ in this specific example. The output of adders 166 is thus the corrected value combined with the contribution value. Selectors 168 may be used, if desired, to disregard the thus calculated value in the event that the particular neighbor is located on the frame of the matrix, or if that output is disabled. Generally, the output of selectors 168 will represent the corrected pixel value plus the contribution value supplied from controller 26. It should be noted that each network 80A-80H and 80Z individually communicates with controller 26 so that the contribution value in each network may be different. The outputs from networks 80E-80G are coupled to the designated inputs of the maximum value selection network 84 shown in FIG. 6. During the next time step, the same sequence of events occurs for contribution calculation networks 80C, 80D, 80B, 80Z, 80A, and 80H. The correction value for these networks is supplied from latches 170.

Turning now to FIG. 6, maximum value selection network 84 uses a logical tree network in which all of the pixel values from contribution networks 80A–80H and 80Z are compared with one another, with the resultant output of the maximum value selection network 84 being the greatest value detected. Referring especially to FIG. 6A, the data values from contribution networks 80E and 80G are compared to two four-bit comparators 176 and 178 with the output of the comparison controlling the switching of multiplexors or selectors 180 and 182. Assume, for example, that the value associated with network 80G is greater than that associated with network 80E. The output from comparator 178 switches selectors 180 and 182 so that their output lines contain the data value from network 80G. Comparator 184 and 186 then compares this output with value associated with network 80F, with the result of that comparison controlling the output of selectors 188 and 190 (FIG. 6B). This process continues in an identical manner until the comparison is funneled down to the output of selectors 192 and 194. It should be noted that the comparison of the output of the networks 80E through 80G occurs one time step earlier than the remaining networks with the result being latched in 188 and 190 for synchronization. The output from selectors 192 and 194 on line 196 represents the maximum value associated with any of the pixels in the neighborhood under consideration. This maximum output is then coupled to adders 198 which serve to subtract out the correction value supplied by generator circuitry 78. Adders 198 comprising the correction factor removal circuit 86 thus supply a transformed value to the next stage which is associated with the maximum pixel value in the neighborhood after being modified by the programmable contribution value via network 80.

FIG. 7 shows the details of the programming and readback logic 82 and stage selection circuitry 76 of the 3-D stage. Like the programming and readback logic 61 of the 2-D stage, logic 82 of the 3-D stage forms no substantial part of the present invention and may be accomplished in a wide variety of known manners depending upon the type of processor utilized for controller 26, logic conventions, layout of semiconductor circuitry if incorporated on an LSI chip, etc.

Figure 7A:
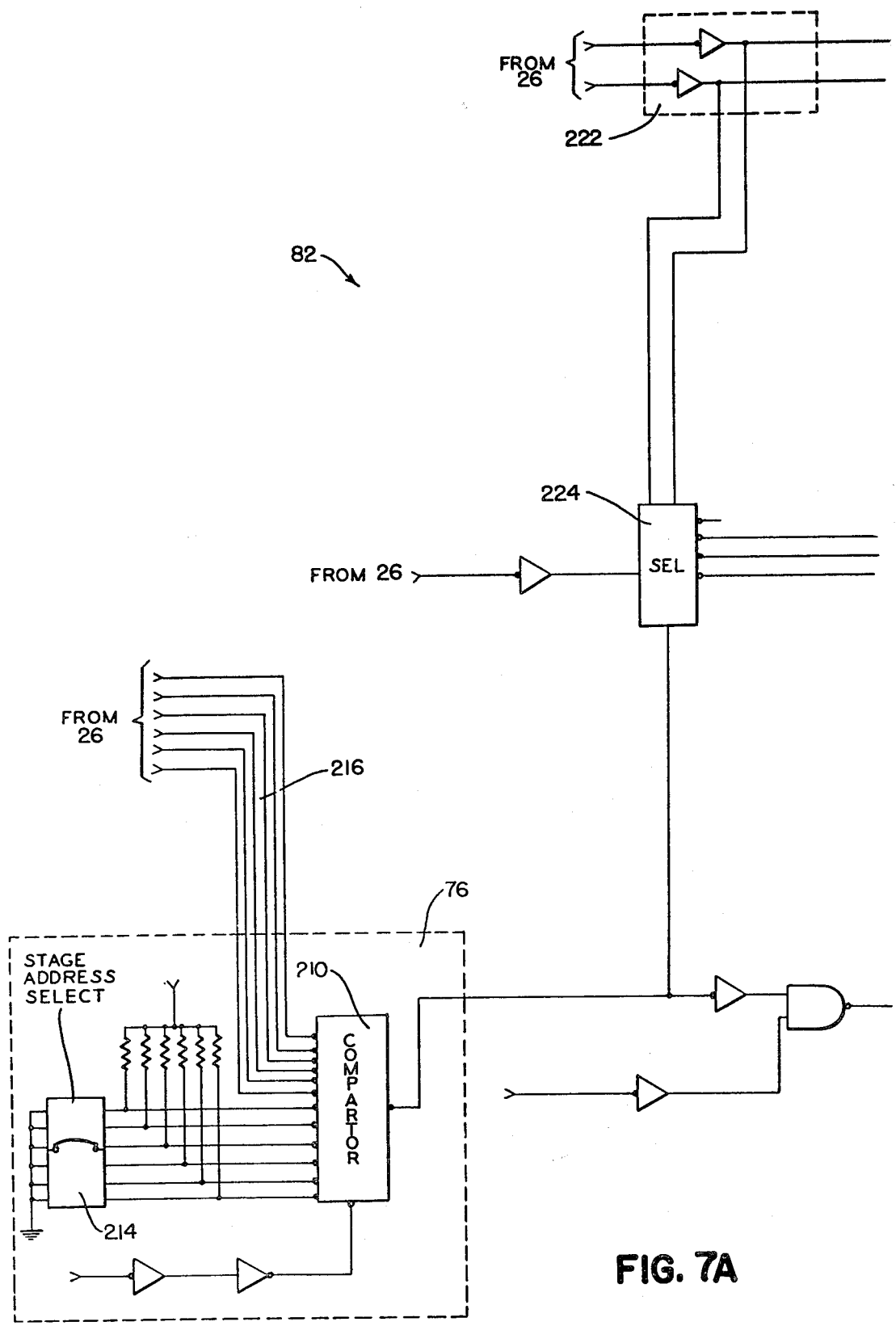
FIGS. 7 (A–B) is a detailed schematic of the I/O and control logic portions of the 3-D stage.
Figure 7B:
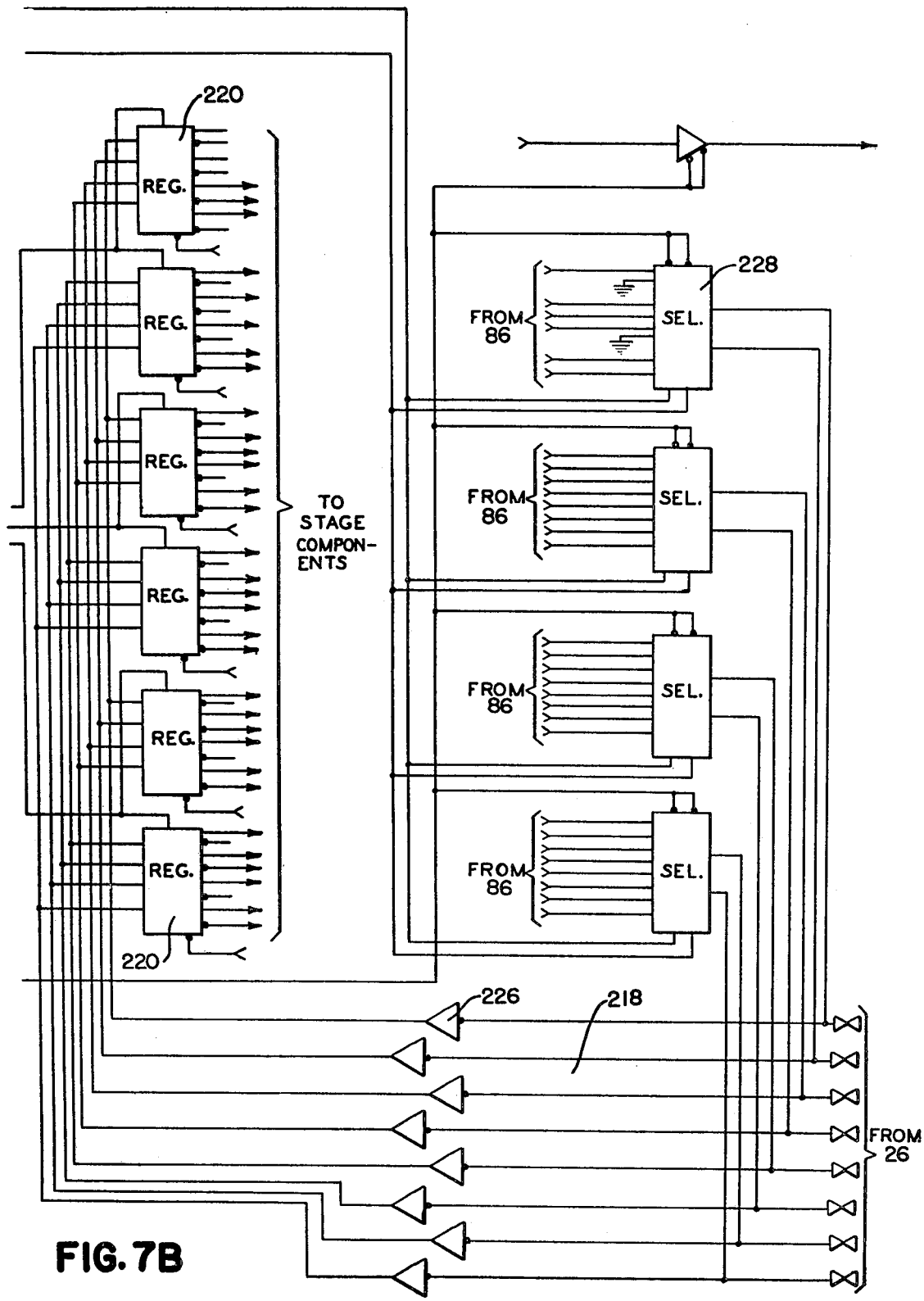

Briefly, the address from controller 26 is compared with a preselected address via address comparator 210 (FIG. 7A). As known in the art, the address may be selected by jumper cables and the like bridging component 214. Controller 26 selects a stage by placing an appropriate address on line 216. Data is placed on the bi-directional data bus 218 (FIG. 7B) to load various control data into registers 220. The output of registers 220 are coupled to the stage components and provide the necessary control signals to the various stage components. Program select circuitry 222 selects the particular register 220 for loading under the control of a load command signal from selector 224. To read data from the output of stage 24, as well as other desired information, the stage is addressed and data is communicated to controller 26 via selectors 228.

G. Examples of 2-D Transformations

Figure 8:
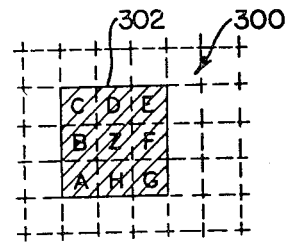
FIG. 8 diagrammatically illustrates an example of a window configuration utilized in the transformation in a 2-D stage.

FIG. 8 diagrammatically illustrates an example of a window configuration utilized in the transformation in a 2-D stage 22. The blocks in the checkerboard matrix 300 may represent picture elements (pixels) in the digitized matrix of a scene. In the original input data each pixel will be represented by a logical one or zero corresponding to black and white areas in the digitized matrix of the scene. The digitized matrix is generally provided by a line by line output of a sensor, such as a vidicon sensor. In this embodiment, the window 302 is a 3×3 array of points comprised of the origin or center cell and its eight immediate neighbors. The letters A-H and Z correspond to the letter designation of the latches in neighborhood extraction portion 38 of FIG. 2. As the pixels or, more particularly, the data associated with them are sequentially shifted through latches 38, all of the neighborhoods in the matrix will be sequentially accessed, with each pixel in the matrix eventually being situated in the center cell position.

Figure 9A:
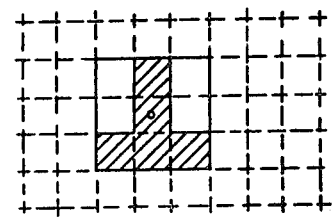
FIGS. 9 (A–C) illustrates three representative elemental structuring elements which may be utilized in a 2-D transformation.
Figure 9B:
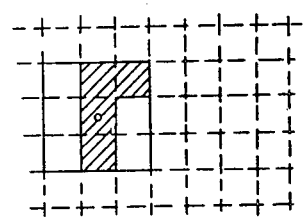
Figure 9C:
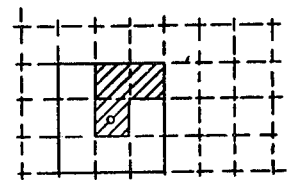

Any subset of the window 301 which would include the center cell is called an elemental structuring element. There are 256 possible 2-D elemental structuring elements, three of which are shown in FIGS. 9A–9C.

Figure 10A:
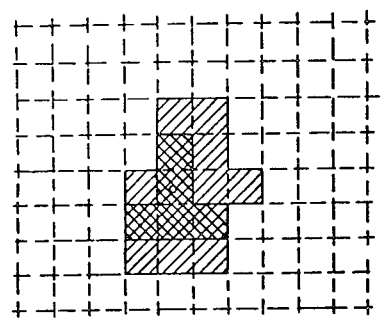
FIGS. 10 (A–B) illustrates a sequence of dilation steps utilizing the elemental structuring elements shown in FIG. 9 to form a primary structuring element.
Figure 10B:
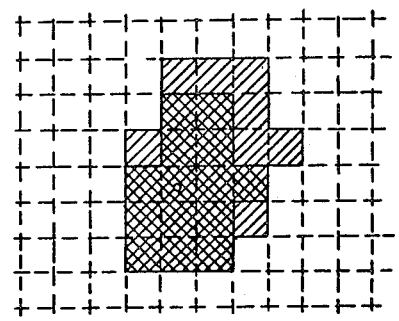

Assume, for example, that it is desired to detect every position in a scene in which a particular object can be located. By way of a simple illustration, let the configuration of FIG. 11A represent the digitized input matrix of the scene and the entire cross-hatched configuration of FIG. 10B represent the object.

According to the preferred embodiment of the invention, the first step is to utilize a series of dilation transformations which effectively construct the object to be detected. FIGS. 10A–10B show a series of dilation steps using the elemental structuring elements shown in FIG. 9. The operator via terminal 12 locates these predefined structuring elements in disc storage 14 and selectively loads them via program and readback logic 61 into the neighborhood configuration detection circuitry 46 of the first three 2-D stages in the pipeline. A convenient point in an otherwise blank matrix is chosen by the operator as a starting point for the dilation process. In the first 2-D stage, this point is dilated to form the structuring element shown in FIG. 9A. Dilation is effectively a geometric addition. It can be envisioned as the process of growing a particular pattern configuration from a point in the matrix in which the center point of the structuring element is superimposed over each data point containing a specified value in the matrix. Since there is only one valued data point in the starting matrix, the output of the first 2-D stage will represent the configuration shown in FIG. 9A. FIG. 10A shows the transformed output of the second 2-D stage caused by the dilation of elemental structuring element 9A by the structuring element shown in 9B. Analogously, FIG. 10B illustrates the resultant dilation of the pattern shown in 10A with the elemental structuring element of FIG. 9C. This is carried out in the third 2-D stage 22. Thus, the object to be detected is generated by a sequence of three dilation steps using the elemental structuring elements shown in FIG. 9. These structuring elements and the sequence of the transformations are then stored in a storage device such as disc 14 for further use. It should be realized that a wide variety of objects can be created by a more lengthy series of dilation steps. System 10 can be utilized by itself in the event that only a few objects are desired to be detected. The series of dilation steps necessary to generate the object can be performed beforehand, loaded into the 2-D stages 22 and utilized in the now to be described erosion process for detecting the object.

FIG. 11A represents the digitized input matrix of the scene. As noted before, this matrix is typically generated by known infrared scanners and the like. The digital electrical signals representing this matrix are routed by controller 26 over line 28 into the 2-D processing pipeline in which a series of three erosion steps are performed, one in each stage.

For purposes of this invention, an image A eroded by a structuring element B is the set of all points P in which A entirely contains element B. In other words, those points are subtracted from image A if, when the center of element B is placed on point P, the entire element B is not contained in the image A. Conversely, erosion can be envisioned as a dilation of the white part of the image shown in the drawings by the inverted (rotated 180° about its center) elemental structuring elements. In this example, controller 26 loads the neighborhood detection circuitry 46 of the first 2-D stage with the inversion of the structuring element shown in FIG. 9C, the second stage with the inversion of the structuring element of FIG. 9B, and the third stage with the inversion of the elemental structuring element of FIG. 9A. IRAM 36 is loaded such that the white or zero values are considered active neighbors such that the transformation output represents a dilation of those pixels.

Figure 11E:
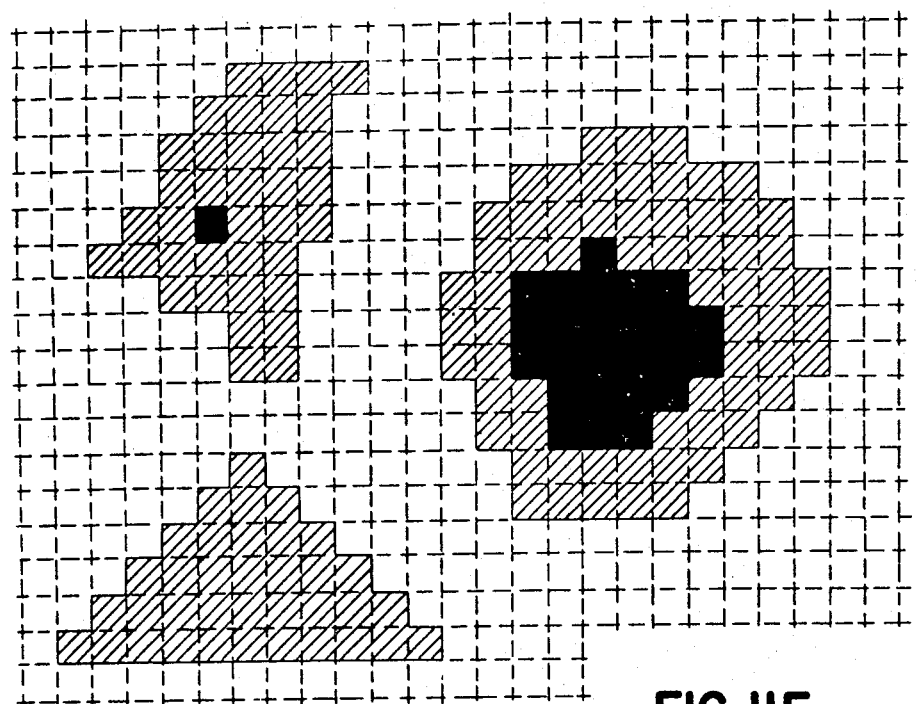
FIGS. 11 (A–E) shows a sequence of erosion steps utilizing the elemental structuring elements shown in FIG. 9 to determine the points in FIG. 11A at which the primary structuring element of FIG. 10B is completely contained.

The double cross-hatched area of FIG. 11B represents the output of the first 2-D stage caused by the erosion of the digital signals representing the matrix of FIG. 11A by the structuring element of FIG. 9C. This transformed output is then applied to the input of the second 2-D stage where it is eroded by the structuring element shown in FIG. 9B. FIG. 11C shows in the double cross-hatched area the resultant output of the second 2-D stage. Similarly, FIG. 11D shows the resultant output of the third 2-D stage. The double cross-hatched areas of FIG. 11D have been superimposed on the original matrix in FIG. 11E. The darkened areas in FIG. 11E represent each point in the original matrix in which the object of FIG. 10B can be completely contained. It is important to realize that the orientation and shapes of the objects in the original matrix are scrutinized by this series of neighborhood transformations so that only areas which are large enough and of the correct shape and orientation to contain the desired object are detected. The output of the last stage may be coupled back through controller 26, which, in turn, can be utilized to activate an external device. For example, if the system is used in an armed aircraft, it could be utilized to automatically trigger artillery at those locations which could contain the target. Alternatively, the output could be used to form a printout on peripheral devices, could be displayed on color CRT display 16, etc. A wide variety of uses for this unique pattern detection and recognition system should readily be envisioned by those skilled in the art and fall within the scope of this invention.

H. Dynamic Data Correction Feature

Figure 12:
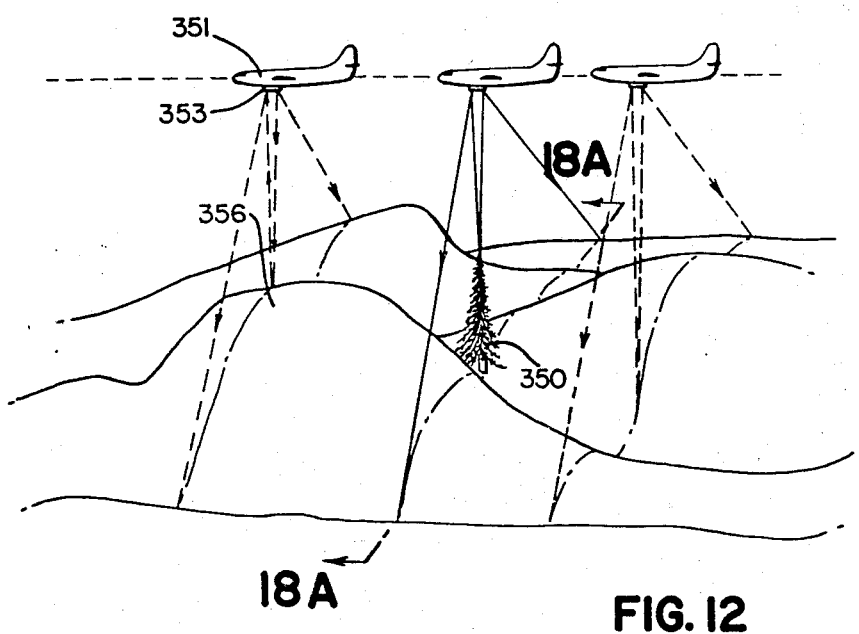
FIG. 12 shows an example of a 3-dimensional image scene from which data may be obtained.

Assume for purposes of this example that it is desirous to locate the position of the pine tree 350 in a scene such as shown in FIG. 12 which includes several hills adjacent to the pine tree 350 which is disposed in a valley. Assume further that the height of the surrounding hill 356 is approximately the same as the height of the pine tree 350.

Figure 13:
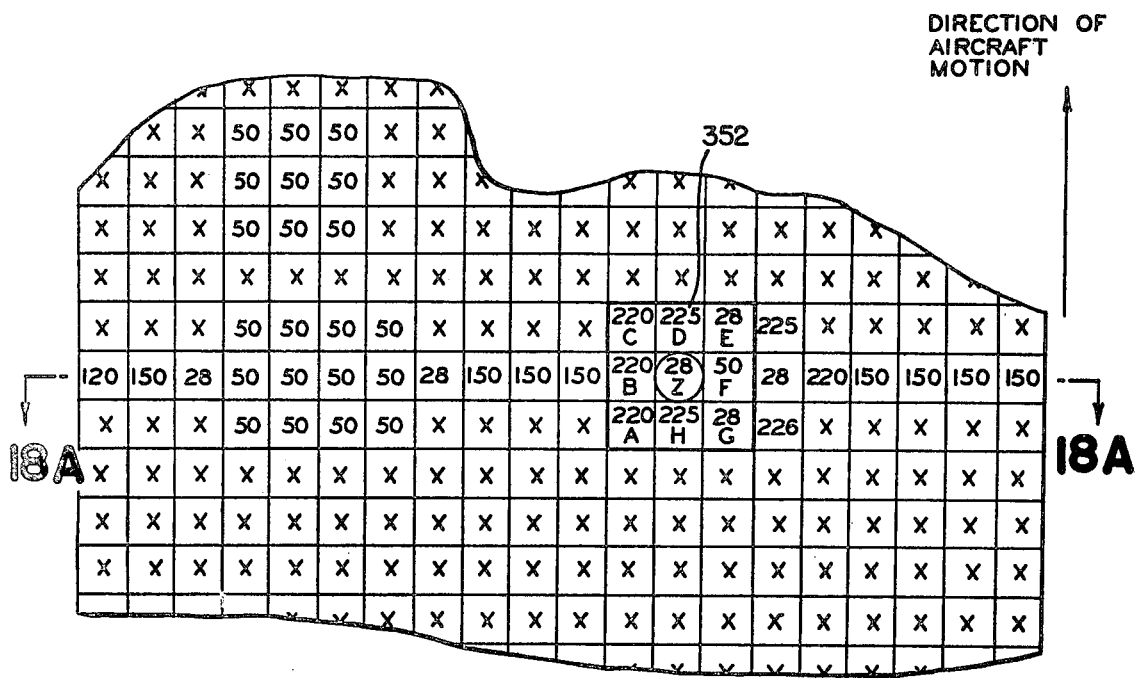
FIG. 13 diagrammatically illustrates the output of a typical scanner sensing the scene of FIG. 12.

The output of a ranging scanner 353 in airplane 351 monitoring the scene shown in FIG. 12 may be represented by the oversimplified matrix shown in FIG. 13. The completed horizontal line in FIG. 13 represents a horizontal scan line output from the scanner. In this example the scanner provides an eight bit digitized output representing the distance between the scanner and the points in the scene. It should be understood that all of the pixel elements have values in the matrix, but values for only portions of the matrix are shown in FIG. 13. The value of the outputs of this and many other scanners are generally based upon the difference of the phase relationship between a reference signal and the reflected signal from the scene. However, once the phase relationship becomes greater than 360° out of phase, a phenomenon known as "wrap around" is encountered. For example, for phase differences between 0° and 360° the output of the scanner will proportionally be between 0 and $2^8-1$ (255) in a digital format. However, once the phase relationship gets over 360°, the output of the scanner must return to zero and then progress upwardly again. The maximum digitized output of the scanner is known as the ambiguity interval. Therefore, if the ambiguity interval is less than the maximum sensed range of some of the image points, the wrap around phenomenon is encountered. Referring to FIG. 13, the number 50 represents the highest point in the scene of FIG. 12. However, this wrap around phenomenon has been encountered such that the lower portions of the scene actually have a higher digitized value. For example, the areas adjacent the pine trees are shown with digitized values of 220 even though they are clearly not as high as the tip of the pine tree. It is a feature of this invention that correction circuitry is provided so that the system may utilize digitized scanner output signals in which the wrap around phenomenon has occured.

Figure 14A:
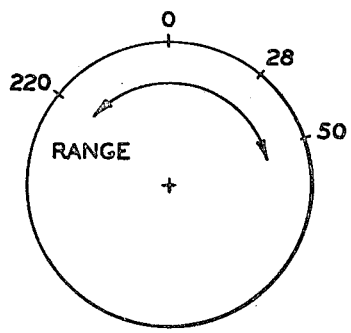
FIGS. 14 (A–B) diagrammatically illustrates the dynamic data generator feature of this invention utilizing the data in the window of FIG. 13.
Figure 14B:
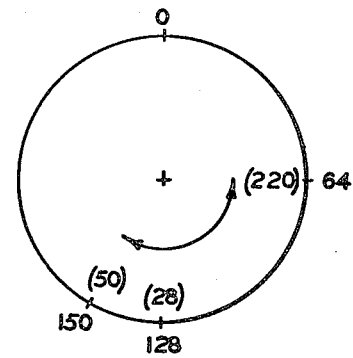

With reference to FIGS. 13 and 3, assume that the window 352 is contained in neighborhood extraction portion 74, with the center cell value of 28 being contained in latch 74Z. The range of the neighborhood values of the input data before correction is between 220 and 50, as diagrammatically shown in FIG. 14A. But for the dynamic data generator circuitry 78, the maximum value selection network 84 would erroneously consider the value 220 (or 221 if a contribution value of +1 is added thereto) as the maximum value in the neighborhood. Generator circuitry 78, however, senses the value in the center cell latch 74Z and calculates a correction value according to the formula:

$$\text{CORRECTION VALUE} = \frac{2^N}{2} - Z$$

where N is the number of bits in the incoming stream of digital electrical signals and Z is the value of the central data point in the neighborhod. In this specific example, N is eight, corresponding to the eight bit input data and Z is 28. Therefore, the correction value is 100 (256÷2−28). Referring specifically to FIG. 5B, the most significant bit of selectors 160 is prewired to an inverted value of the most significant bit of the center cell by way of inverter 99. The lesser significant bits of the center cell are coupled to other inputs of selectors 160 but are not inverted. The outputs of selectors 160 are negated as represented by the circles on the output lines in the drawing. As familiar to one skilled in the art, such a data operation will automatically provide a digital approximation of the value of the central cell subtracted from $2^8/2$. Assuming that the correction value is to be used in the stage (as determined by a control signal from controller 26), in this example the binary inputs to selectors 160 would be 10011100 (binary representation of the center cell value of $28_{10}$ with the most significant bit inverted) and the outputs would be 01100011 (binary representation of $99_{10}$). The correction value generated by this convenient logical manipulation thus deviates from the ideal value (100) by one but it does not significantly affect the results. If desired, the ideal value can be readily generated by logic which would subtract the center cell value from 128 ($2^8/2$). In this specific embodiment, the value of the central cell is derived from latch 74B prior to it being shifted to the center cell. The output of generator circuitry 78 is referred to as a correction value. This correction value is applied to each of the neighborhood contribution calculation networks 80. In this specific embodiment, the correction value from selectors 160 are added to adders 162 in networks 80E, 80F and 80G during one time step whereas the correction value is added to the remaining networks 80 via latch 170 during the next time step. Hence, the output of adders 162 will have been adjusted by the correction value from dynamic data correction generator 78 such that the entire range between the highest and lowest pixel value will be uninterrupted by warp around as shown in FIG. 14B. Hence, the maximum value selection process can truly detect the pixel value having the greatest real value. After the maximum value network 84 has determined the maximum value, the correction value is subtracted from the output of network 84 to normalize the transformation, i.e. delete the correction value from the pixel value such that the next stage will not misinterpret the data. The correction factor is removed by circuitry 86 which, in this example consists of adders 198 (FIG. 6B) having one input coupled to the output of correction generator 78. It should be noted that while the dynamic data generator circuitry 78 finds particular utility in resolving this "wrap around" phenomena with respect to scanner data, it is also extremely useful in simplifying the detection of maximum values when the input data words obtained from more generalized data sources contain more bits than the word length used by the processing circuits. Such a circuit takes optimum advantage of the dynamic range available to a digital signal processor.

I. 3-D Transformation Examples

The reader's attention is directed again to the original example relating to FIG. 12 in which it is desired to locate the position of pine tree 350 in the scene shown therein. In contrast with the 2-D window configuration of FIG. 8 which was a 3×3 matrix, the 3-D window configuration as shown in FIG. 15A is a 3×3×3 matrix. This window configuration is used when the pixel arrangement of the matrix is presented in a rectangular form such as shown in FIG. 13. Alternatively, the 3-D window of FIG. 15B can be used when the pixel arrangement is presented in a hexagonal arrangement such as shown in FIG. 15C which may advantageously be utilized in some instances in order to maintain line connectivity when the system is used, for example, for character recognition purposes. In either event, the method of utilizing the system of the present invention is substantially the same.

As in the 2-D example, the primary structuring element is constructed by a plurality of dilation steps using various elemental structuring elements. The 3-D elemental structuring elements are also a subset of the pattern configuration which will fit into the 3×3×3 3-D window. As noted in FIG. 15A, the 3-D window includes bottom, middle, and top planes. FIG. 16C shows a typical 3-D elemental structuring element.

Like the 2-D example, the primary structuring element is formed by a series of dilation steps, beginning with a surface of one point of height one, using as many different elemental structuring elements as necessary to form the desired configuration. FIG. 16A shows the contribution values which would be programmed by controller 26 into the neighborhood contribution calculation networks 80 in the first stage for particular elemental structuring element shown in FIG. 16C. By way of convention, a contribution value of zero represents the middle plane, +1 the top plane, −1 the bottom plane, and x no pixels at all in the designated column. For example, the contribution values shown in FIG. 16A would be applied to network 80 as follows: +1 value being applied to network portions 80B, 80E, and 80F, zero being applied to network portions 80D, 80G, and 80Z, −1 being applied to network portion 80D, with outputs disabled on network portions 80C and 80H.

Referring to FIG. 17, the primary structuring element is chosen in this example to be a hemispherical structure such as hemisphere B. The hemisphere B is generated by a series of dilations using selected structuring elements such as the one noted above such that the diameter of the hemisphere is greater than that associated with the majority of the object to be located (i.e. pine tree 350), but small enough so that the diameter of the hemisphere B will fit into the rolling hill such as hill 356. The cross section of the scene of FIG. 12 along lines 18A is represented by surface A in FIG. 18A to illustrate a typical scanner output of the scene.

Figure 18A:
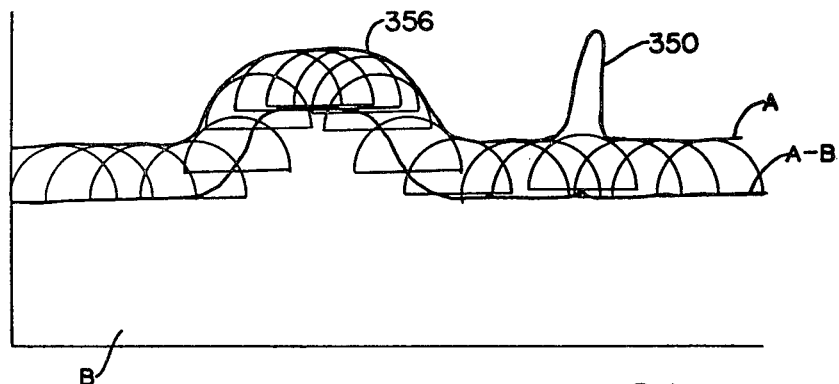
FIGS. 18 (A–C) diagrammatically illustrates a sequence of erosion and dilation steps performed by the 3-D transformation stages utilized to detect the location of the pine tree in FIG. 12.

FIG. 18A illustrates the result of the erosion of surface A by structuring element B to leave the surface A-B. As described above, the erosion takes place in the chain of 3-D stages 24, with each stage providing its transformed output to the next stage. Surface A is eroded by the same elemental structuring elements which were used to generate primary structuring element B. Assume that the 3-D elemental structuring element associated with the array of contribution valves shown in FIG. 16A was utilized in generating hemisphere B. The inversion of the structuring element represented by FIG. 16A is illustrated in FIG. 16B. The contribution values shown therein are utilized to selectively program one of the successive stages 24 during the erosion process by controller 26. Likewise, other stages are programmed with the inversions of the structuring elements which generated the hemisphere. Controller 26 places an appropriate signal, such as a high or logical 1 level, on the one input of the exclusive OR gates 152 (FIG. 5A) making up dilation/erosion control circuitry 68 of the first stage of the group performing the erosion step such that the incoming data stream is changed to form its logical complement, i.e., previous logical 1 states will be changed to logical zero states and vice versa. The eroded surface is thus obtained as a dilation at the 0's in the three dimensional matrix by the inverted hemisphere. The new surface A-B thus formed by the erosion steps generally parallels surface A except for the surface portions associated with pine tree 350 since the hemisphere B will not closely "fit" within the confines of pine tree 350 but will fit into the confines of hill 356 even though it is of the same general height. New surface A-B can be interpreted as those points where the center of structuring element B will be as it is moved around under the surface A.

Figure 18B:
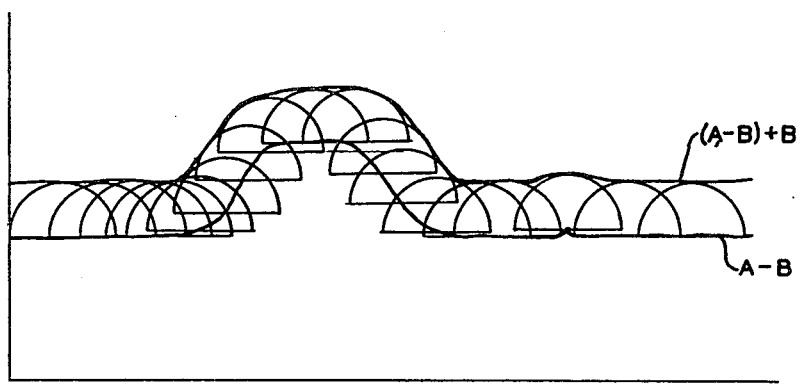

The eroded surface A-B is then dilated by the primary structuring element B to form a new surface (A-B)+B as shown in FIG. 18B. This dilation is carried forth in the manner described above. The dilation erosion control circuitry 68 permits this dilation to occur by continuing the data down the pipeline without the necessity of returning the data back to disk storage device 14, reprogramming the stages, etc. Instead, subsequent stages in the pipeline are programmed with the elemental structuring elements and the dialtion/erosion control circuitry 68 of the first stage of the dilation group is provided with a high signal to form the logical complement of the incoming data from the previous group of stages which immediately prior performed the erosion steps. Hence, the data values are effectively returned back to their noncomplemented form prior to the transformations in the stages performing the dilation. The new surface (A-B)+B substantially corresponds to original surface A except for the portions of surface A in which the primary structuring element B cannot be contained. In other words, surface (A-B)+B represents those points on the original surface A which are tangent to the hemisphere B. This process is referred to as ground plane estimation.

The data points associated with surface A and the generated ground plane estimated surface (A-B)+B are then subtracted from each other electronically by controller 26 in a known manner to form a ground plane normalized surface. Basically, this would be a point by point subtraction of each pixel element in the matrices of the two surfaces.

Figure 18C:
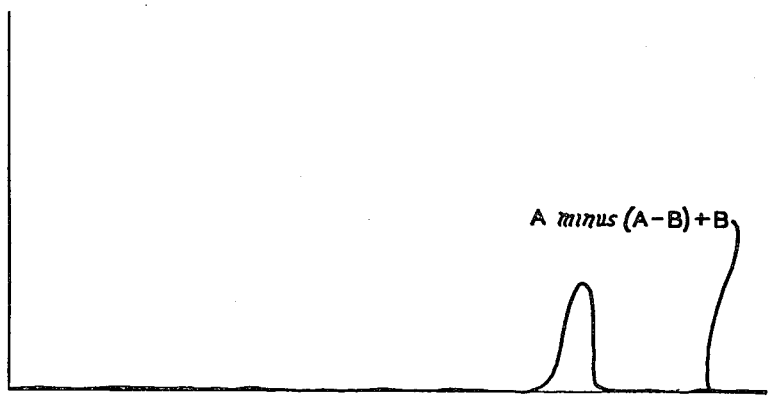

FIG. 18C shows the resultant comparison between these two matrices. The surface designated A minus (A-B)+B thus clearly differentiates between the data points associated with pine tree 350 and the surrounding terrain even though the hills therein may have the same height. The location of pine tree 250 is thus detected since the data points associated with the peak shown in FIG. 18C are the only locations in which a configuration similar to a pine tree may be located in the scene. Known thresholding techniques can be utilized if desired to filter out surface irregularities. However, the ground plane normalization technique of the present invention provides substantial advantages over known prior art methods in which improper illumination and noise factors have caused failure in such systems.

This "rolling ball" technique can also be used to detect valleys of various shapes and sizes. Intuitively, this is done by rolling a somewhat larger ball on top of the surface. The valleys are identified when the top rolling ball is blocked from touching the surface. This is accomplished by dilating and then eroding the surface, as opposed to erosion followed by dilation as outlined in the previous example. By dilating first, the system is effectively measuring to the center of the top of the ball. Thus, by merely switching the order of the erosion and dilation transformation steps, the same primary structuring element can be used to detect either hills or valleys.

Thus, while the 3-D examples were illustrated and described using spherical primary structuring elements, other configurations may also be employed to detect a wider range of features.

The 3-D portion of this invention thus analyzes multivalued digital data directly without thresholding by directly treating the information representing a 3-dimensional surface in contrast to known image analyzing techniques in which the image has been reduced to binary values and analyzed by comparing it with selected window patterns which represent the outline of 2-dimensional or silhouette images. Such a marked contrast with these known techniques has provided an extremely powerful tool in analyzing image data, yet it may be implemented in a cost-effective manner according to the teachings of this invention.

Therefore, while this invention has been described in connection with specific examples thereof, no limiation is intended thereby except as defined in the appended claims.

We claim:

1. Apparatus for analyzing digital data signals having various values representing characteristics of points in a first matrix, said apparatus comprising:
    digital logic circuitry means for performing essentially a one-to-one transformation of substantially all of the points in the first matrix into a second matrix having a corresponding number of points, with the transformation of each point being carried out by:
    means for sensing the value of a data signal associated with a given point in the first matrix;
    means for adjusting the values of data signals associated with a plurality of selected points in the first matrix as a function of the sensed value of the given point; and
    means for generating a new digital value for the given point depending upon the relationship between the adjusted values of the selected data signals whereby substantially all of the points in the first matrix are transformed in like manner to generate a second matrix.

2. The apparatus of claim 1 wherein the value of a center point in a group of neighboring points in the matrix is sequentially sensed as said given point.

3. The apparatus of claim 2 wherein the value of said center point is added to the values of the data signals associated withh the neighboring points.

4. The apparatus of claim 1 which further comprises:
    means for operating on the digital value to change it to another value for the second matrix as a function of the sensed value of the given point to thereby remove any contribution made during adjustment of the values of said data signals in the first matrix.

5. Apparatus for analyzing data represented by a serial stream of digital data signals whose values correspond to characteristics of points in a first image matrix, said apparatus comprising:
    digital logic circuitry means for performing essentially a one-to-one transformation of substantially all of the points in the first matrix into a second matrix having a corresponding number of points, with the transformation of each point being carried out by:
    at least one neighborhood transformation stage, said stage having an input for receiving the stream of digital data signals, neighborhood extraction means for sequentially temporarily storing substantially all neighborhoods in the first matrix, each neighborhood being comprised of data signals associated with a central point and surrounding points in the matrix, means for sensing the value of the data signal associated with a given point in the neighborhood, means for adjusting the values of data signals associated with at least some of the points in the neightborhood as a function of the sensed value of said given point, and means for generating a transformation output value for the given point as a function of the adjusted values of the extracted data signals comprising the neighborhood whereby substantially all of the points in the first matrix are transformed in like manner to generate the second matrix.

6. The apparatus of claim 5 wherein the sensed point the center point in the neighborhood, with the value of the data signal associated with the center point being added to the data signals associated with the points in the neighborhood.

7. The apparatus of claim 6 which further comprises means for subtracting the value of the center point from the transformation output value.

* * * * *